United States Patent
Gijrath et al.

(10) Patent No.: US 12,304,270 B2
(45) Date of Patent: May 20, 2025

(54) VEHICLE SUSPENSION SYSTEM WITH ONE OR MORE FREQUENCY DEPENDENT ROLL STIFFNESS VALVES

(71) Applicant: DRIV Automotive Inc., Northville, MI (US)

(72) Inventors: Hans Gijrath, St. Truiden (BE); Simon Anne De Molina, St. Truiden (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 18/362,338

(22) Filed: Jul. 31, 2023

(65) Prior Publication Data

US 2025/0042215 A1    Feb. 6, 2025

(51) Int. Cl.
*B60G 17/08* (2006.01)
*B60G 21/10* (2006.01)

(52) U.S. Cl.
CPC .......... *B60G 21/103* (2013.01); *B60G 17/08* (2013.01); *B60G 21/106* (2013.01); *B60G 2202/24* (2013.01); *B60G 2204/81* (2013.01); *B60G 2204/8304* (2013.01); *B60G 2500/116* (2013.01)

(58) Field of Classification Search
CPC .... B60G 21/103; B60G 17/08; B60G 21/106; B60G 2202/24; B60G 2204/81; B60G 2204/8304; B60G 2500/116
See application file for complete search history.

(56) References Cited

U.S. PATENT DOCUMENTS

| | | | |
|---|---|---|---|
| 11,440,366 B1 | 9/2022 | O'Shea et al. | |
| 2008/0082235 A1 | 4/2008 | Nakamura | |
| 2023/0302864 A1* | 9/2023 | Sartiaux | B60G 17/056 |

FOREIGN PATENT DOCUMENTS

| | | | |
|---|---|---|---|
| DE | 102014005603 A1 | 10/2014 | |
| DE | 102019100086 A1 * | 7/2020 | |
| EP | 0518056 B1 | 1/1995 | |
| JP | 2631468 B2 | 7/1997 | |
| JP | 2678600 B2 | 11/1997 | |
| KR | 100329059 B1 | 11/2002 | |

OTHER PUBLICATIONS

Muller et al. DE 10 2019 100086, Bypass valve, Machine English Translation, ip.com (Year: 2020).*

* cited by examiner

*Primary Examiner* — Karen Beck
(74) *Attorney, Agent, or Firm* — Harness, Dickey & Pierce, P.L.C.

(57) ABSTRACT

A suspension system including four dampers, a first hydraulic circuit with a front hydraulic line, a rear hydraulic line, and a first longitudinal hydraulic line that extends between and fluidly connects the front and rear hydraulic lines of the first hydraulic circuit, and a second hydraulic circuit with a front hydraulic line, a rear hydraulic line, and a second longitudinal hydraulic line that extends between and fluidly connects the front and rear hydraulic lines of the second hydraulic circuit. One or more frequency dependent valves are connected to and control fluid flow between the first and second hydraulic circuits. The frequency dependent valves are configured to open and hydraulicly decouple the dampers by permitting fluid flow between the first and second hydraulic circuits in response to high frequency suspension impacts.

17 Claims, 11 Drawing Sheets

VEHICLE SUSPENSION SYSTEM WITH ONE OR MORE FREQUENCY DEPENDENT ROLL STIFFNESS VALVES

FIELD

The present disclosure relates generally to suspension systems for motor vehicles. More particularly, the present disclosure relates to suspension systems having one or more frequency dependent passive valves that provide increased stiffness and roll control during low frequency roll movements of the vehicle and softer damping characteristics during high frequency road inputs during rebound and compression strokes.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during corning (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several draw backs associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning). Such mechanical systems cannot be easily switched off or cancelled out when roll stiffness is not need. Some vehicles do have stabilizer bar/anti-roll bar disconnects that may be manually or electronically actuated, but the complexity and cost associated with these systems make them ill-suited for most vehicle applications.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll stiffness of the suspension system of the vehicle. However, the downside of such systems is that ride comfort is more difficult to achieve because bump forces can be transmitted from one damper to another damper across the hydraulic circuit resulting in unwanted suspension movement. Such systems also typically utilize electronically controlled (i.e., active) valves that add to the cost and complexity of the suspension system. Accordingly, there remains a need for improved vehicle suspension systems that can minimize roll while maintaining acceptable levels of ride comfort and do so without excessive cost and complexity.

Various types of damping force generating devices have been developed to generate desired damping forces in relation to the frequency of the inputs from the roads over which the vehicle travels. These frequency dependent selective damping devices have been used to provide softer rebound and/or compression damping characteristics during high frequency road inputs. Typically, these frequency dependent damping devices are located inside the pressure tube of the damper and are arranged in fluid communication with the rebound chamber or compression chamber. Thus, these frequency dependent damping devices operate only during rebound or compression movements of a damper and only change the rebound or compression damping rate of the damper in which they are installed.

SUMMARY

This section provides a general summary of the disclosure, and is not a comprehensive disclosure of its full scope or all of its features.

In accordance with one aspect of the subject disclosure, a suspension system is provided that includes four dampers: a front left damper, a front right damper, a back left damper, and a back right damper. The front left damper includes a first compression chamber and a first rebound chamber. The front right damper includes a second compression chamber and a second rebound chamber. The back left damper includes a third compression chamber and a third rebound chamber. The back right damper includes a fourth compression chamber and a fourth rebound chamber. The suspension system of the present disclosure also includes first and second hydraulic circuits.

The first hydraulic circuit includes a front hydraulic line, a rear hydraulic line, and a first longitudinal hydraulic line that extends between and fluidly connects the front and rear hydraulic lines of the first hydraulic circuit. The front hydraulic line of the first hydraulic circuit extends between and fluidly connects the first longitudinal hydraulic line and the second rebound chamber of the front right damper. The rear hydraulic line of the first hydraulic circuit extends between and fluidly connects the first longitudinal hydraulic line and the fourth rebound chamber of the back right damper. The first longitudinal hydraulic line extends between and fluidly connects the first compression chamber of the front left damper and the third compression chamber of the back left damper.

The second hydraulic circuit includes a front hydraulic line, a rear hydraulic line, and a second longitudinal hydraulic line that extends between and fluidly connects the front and rear hydraulic lines of the second hydraulic circuit. The front hydraulic line of the second hydraulic circuit extends between and fluidly connects the second longitudinal hydraulic line and the first rebound chamber of the front left damper. The rear hydraulic line of the second hydraulic circuit extends between and fluidly connects the second longitudinal hydraulic line and the third rebound chamber of the back left damper. The second longitudinal hydraulic line extends between and fluidly connects the second compression chamber of the front right damper and the fourth compression chamber of the back right damper.

The suspension system further includes one or more frequency dependent valves positioned between the first and second hydraulic circuits. Each frequency dependent valve has a closed position where the frequency dependent valve blocks fluid flow between the first and second hydraulic circuits and an open position where the frequency dependent valve permits fluid flow between the first and second hydraulic circuits. Thus, the first and third compression chambers of the front left and back left dampers are fluidly coupled to the second and fourth rebound chambers of the front right and back right dampers by the first hydraulic circuit and the second and fourth compression chambers of the front right and back right dampers are fluidly coupled to the first and third rebound chambers of the front left and back left dampers by the second hydraulic circuit such that the suspension system provides passive roll resistance when the one or more frequency dependent valves are closed. The frequency dependent valve(s) are configured to switch from the closed position to the open position to hydraulically decouple the dampers when fluid pressure increases within the first or second hydraulic circuits rise above a predetermined threshold frequency, which minimizes unwanted suspension movements in the other dampers when one of the dampers undergoes a high frequency impact caused by a bump, pot-hole, or other imperfection in the road/surface that the vehicle is traveling over.

In accordance with another aspect of the present disclosure, each of the dampers may include a damper housing and one or more frequency dependent valves disposed on or in the damper housing. Thus, each damper may include a dedicated frequency dependent valve or two dedicated frequency dependent valves that selectively allow fluid flow between the hydraulic lines of the first and second hydraulic circuits to hydraulically decouple the damper from the other dampers in the suspension system.

In accordance with another aspect of the present disclosure, the suspension system also includes a pump assembly that has a pump and a manifold assembly that has first and second manifold valves, which are electromechanical valves that are arranged in fluid communication with the pump assembly. The first hydraulic circuit further includes a first manifold conduit that extends between and fluidly connects the first longitudinal hydraulic line and the first manifold valve and the second hydraulic circuit further includes a second manifold conduit that extends between and fluidly connects the second longitudinal hydraulic line and the second manifold valve. In accordance with this aspect of the present disclosure, the frequency dependent valve(s) are disposed on or in the manifold assembly and are arranged to control fluid flow between the first and second manifold conduits. Thus, the frequency dependent valve(s) blocks fluid flow between the first and second manifold conduits in the closed position and permit fluid flow between the first and second manifold conduits in the open position. As a result, the suspension system provides passive roll resistance when the frequency dependent valve(s) are closed and the frequency dependent valve(s) are configured to switch from the closed position to the open position to hydraulicly decouple the dampers when fluid pressure increases within the first or second hydraulic circuits rise above a predetermined threshold frequency.

Advantageously, the suspension system of the present disclosure is able to reduce/eliminate vehicle roll while cornering for improved grip, performance, handling, and braking. The reduction of roll angles improves the comfort, steering feel, agility, and stability of the vehicle. At the same time, the frequency dependent valves decouple the dampers during high frequency impacts to minimizes unwanted suspension movements in the other dampers when one of the dampers undergoes a high frequency impact caused by a bump, pot-hole, or other imperfection in the road/surface that the vehicle is traveling over. This improves ride quality and allows the suspension system to be tuned for more aggressive roll resistance when the frequency dependent valves are closed. Also, because the frequency dependent valves are passive valves, they eliminate the cost and complexity of active, electromechanical valves, which require controllers and electrical connections/wires.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
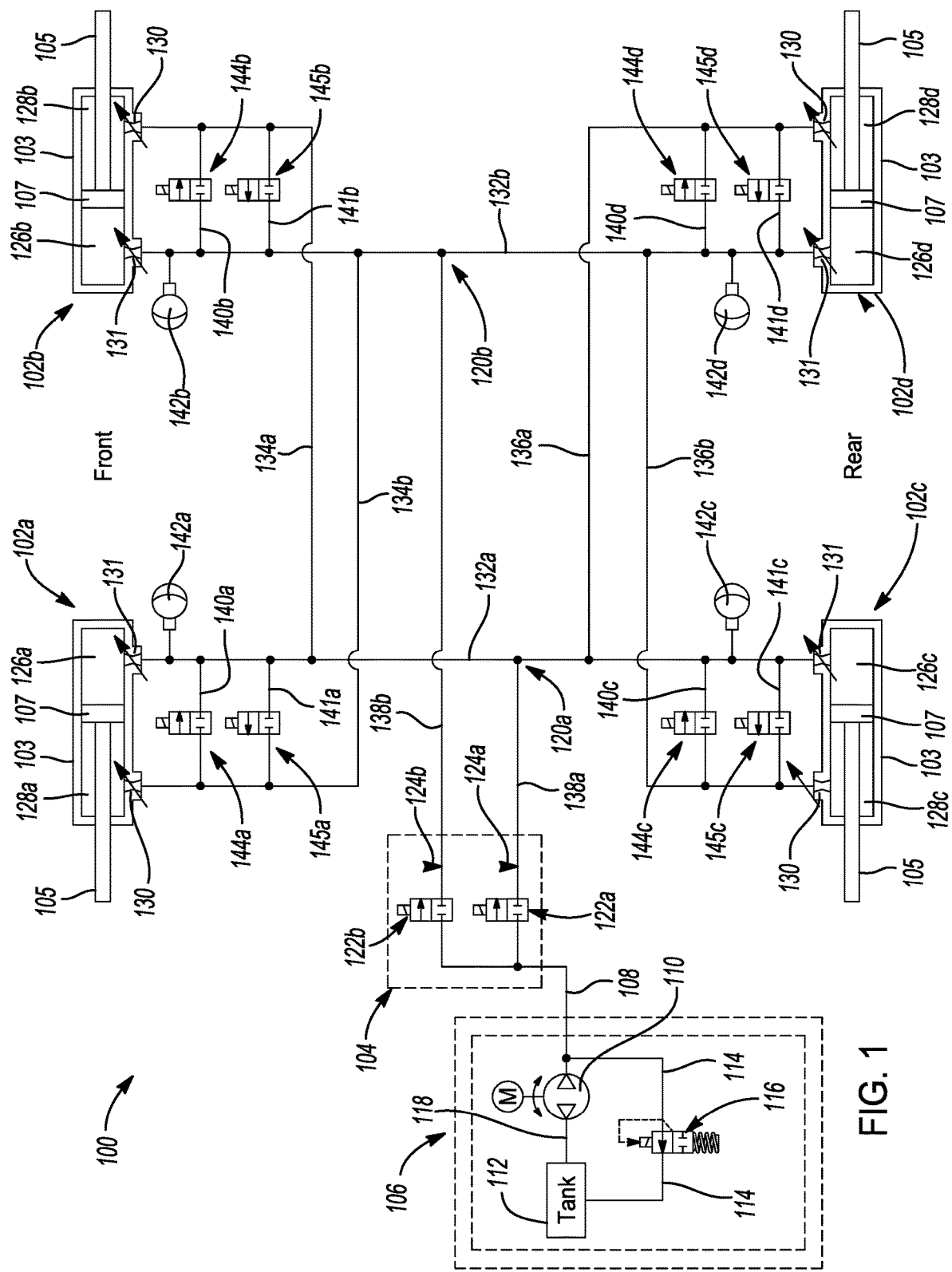
FIG. 1 is a schematic diagram illustrating an exemplary suspension system of the present disclosure that includes eight frequency dependent roll stiffness valves with two at each damper.

Referring to the Figures, wherein like numerals indicate corresponding parts throughout the several views, various comfort valve equipped suspension systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a suspension system 100 including a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of a vehicle to control vertical movements of the front and rear wheels of the vehicle. Thus, the front left damper 102a controls (e.g., dampens) up and down (i.e., vertical) movements of the front left wheel of the vehicle, the front right damper 102b controls (e.g., dampens) up and down (i.e., vertical) movements of the front right wheel of the vehicle, the back left damper 102c controls (e.g., dampens) up and down (i.e., vertical) movements of the back left wheel of the vehicle, and the back right damper 102d controls (e.g., dampens) up and down (i.e., vertical) movements of the back right wheel of the vehicle.

The suspension system 100 also includes a manifold assembly 104 that is connected in fluid communication with a pump assembly 106 by a pump hydraulic line 108. Although other configurations are possible, in the illustrated example, the pump assembly 106 includes a bi-directional pump 110, a hydraulic reservoir 112 (e.g., a tank), and a bypass hydraulic line 114 that can be open and closed by a pressure relief valve 116. The bi-directional pump 110 includes a first inlet/outlet port that is connected to the pump hydraulic line 108 and a second inlet/outlet port that is connected in fluid communication with the hydraulic reservoir 112 by a reservoir hydraulic line 118. The bi-directional pump 110 may operate (i.e., pump fluid) in two opposite directions depending on the polarity of the electricity that is supplied to the pump 110, so the first inlet/outlet port may operate as either an inlet port or an outlet port depending on the direction the bi-directional pump 110 is operating in and the same is true for the second inlet/outlet port of the bi-directional pump 110. In the example where the first inlet/outlet port is operating as an inlet port for the bi-directional pump 110 and the second inlet/outlet port is operating as an outlet port for the bi-directional pump 110, the bi-directional pump 110 draws in hydraulic fluid from the pump hydraulic line 108 via the first inlet/outlet port and discharges hydraulic fluid into the reservoir hydraulic line 118 via the second inlet/outlet port. As such, the bi-directional pump 110 produces a negative pressure in the pump hydraulic line 108 that can be used by manifold assembly 104 to reduced fluid pressure in the suspension system 100. In the example where the second inlet/outlet port is operating as an inlet port for the bi-directional pump 110 and the first inlet/outlet port is operating as an outlet port for the bi-directional pump 110, the bi-directional pump 110 draws in hydraulic fluid from the reservoir hydraulic line 118 via the second inlet/outlet port and discharges hydraulic fluid into the pump hydraulic line 108 via the first inlet/outlet port. As such, the bi-directional pump 110 produces a positive pressure in the pump hydraulic line 108 that can be used by manifold assembly 104 to increase fluid pressure in the suspension system 100. The bypass hydraulic line 114 runs from the pump hydraulic line 108 to the hydraulic reservoir 112 and bleeds fluid back into the hydraulic reservoir 112 when the pressure in the pump hydraulic line 108 exceeds a threshold pressure that causes the pressure relief valve 116 to open.

The manifold assembly 104 is connected in fluid communication with the front and rear dampers 102a, 102b, 102c, 102d by first and second hydraulic circuits 120a, 120b. The manifold assembly 104 includes first and second manifold valves 122a, 122b that are connected in parallel with the pump hydraulic line 108. The first hydraulic circuit 120a is connected in fluid communication with the first manifold valve 122a and the second hydraulic circuit 120b is connected in fluid communication with the second manifold valve 122b. The manifold assembly 104 also includes a first pressure sensor 124a that is arranged to monitor the pressure in the first hydraulic circuit 120a and a second pressure sensor 124b that is arranged to monitor the pressure in the second hydraulic circuit 120b. The bi-directional pump 110 of the pump assembly 106 and first and second pressure sensors 124a, 124b and the first and second manifold valves 122a, 122b of the manifold assembly 104 are electrically connected to a controller (not shown), which is configured to activate (i.e., turn on in forward or reverse) the bi-directional pump 110 and electronically actuate (i.e., open and close) the first and second manifold valves 122a, 122b in response to various inputs, including signals from the first and second pressure sensors 124a, 124b. When the controller opens the first and second manifold valves 122a, 122b, the fluid pressure in the first and second hydraulic circuits 120a, 120b increases or decreases depending on which direction the bi-directional pump 110 is running in. For example, the first and/or second manifold valves 122a, 122b may be opened while the bi-directional pump 110 is running in a first direction where the bi-directional pump 110 draws in hydraulic fluid from the reservoir hydraulic line 118 and discharges hydraulic fluid into the pump hydraulic line 108 to produce a positive pressure in the pump hydraulic line 108 that increases fluid pressure in the first and/or second hydraulic circuits 120a, 120b depending on which of the first and second manifold valves 122a, 122b are opened. Alternatively, the first and/or second manifold valves 122a, 122b may be opened while the bi-directional pump 110 is running in a second direction where the bi-directional pump 110 draws in hydraulic fluid from the pump hydraulic line 108 and discharges hydraulic fluid into the reservoir hydraulic line 118 to produce a negative pressure in the pump hydraulic line 108 that reduces fluid pressure in the first and/or second hydraulic circuits 120a, 120b depending on which of the first and second manifold valves 122a, 122b are opened.

The anti-roll capabilities of the suspension system 100 will be explained in greater detail below; however, from FIG. 1 it should be appreciated that fluid pressure in the first and second hydraulic circuits 120a, 120b operate to dynamically adjust the roll stiffness of the vehicle and can be used to either augment or completely replace mechanical stabilizer bars/anti-roll bars. Such mechanical systems require relatively straight, unobstructed runs between each of the front dampers 102a, 102b and each of the back dampers 102c, 102d. Accordingly, the suspension system 100 disclosed herein offers packaging benefits because the dampers 102a, 102b, 102c, 102d only need to be hydraulically connected to the manifold assembly 104.

Each of the dampers 102a, 102b, 102c, 102d of the suspension system 100 includes a damper housing 103, a piston rod 105, and a piston 107 that is mounted on the piston rod 105. The piston 107 is arranged in sliding engagement with the inside of the damper housing 103 such that the piston 107 divides the damper housing 103 into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 128c, and the back right damper 102d includes a fourth compression chamber 126d and a fourth rebound chamber 128d.

In the example illustrated in FIG. 1, the piston 107 in each damper 102a, 102b, 102c, 102d is a closed piston with no fluid flow paths defined within the piston 107 or by its structure. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. By contrast, the compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

Each damper 102a, 102b, 102c, 102d also includes rebound and compression valves 130, 131, which are installed in the damper housing 103. The rebound valve 130 of each damper 102a, 102b, 102c, 102d is arranged in fluid communication with the rebound chamber 128a, 128b, 128c, 128d of the damper 102a, 102b, 102c, 102d and the compression valve 131 of each damper 102a, 102b, 102c, 102d is arranged in fluid communication with the compression chamber 126a, 126b, 126c, 126d of the damper 102a, 102b, 102c, 102d. The rebound and compression valves 130, 131 can be passive/spring-biased valves (e.g., spring-disc stacks) or active valves (e.g., electromechanical valves) and control fluid flow into and out of the compression and rebound chambers of the dampers 102a, 102b, 102c, 102d to provide one or more rebound dampening rates and compression dampening rates for each of the dampers 102a, 102b, 102c, 102d.

The first hydraulic circuit 120a includes a first longitudinal hydraulic line 132a that extends between and fluidly connects the compression valve 131 of the front left damper 102a and thus the first compression chamber 126a with the compression valve 131 of the back left damper 102c and thus the third compression chamber 126c. The first hydraulic circuit 120a includes a front hydraulic line 134a that extends between and fluidly connects the first longitudinal hydraulic line 132a with the rebound valve 130 of the front right damper 102b and thus the second rebound chamber 128b. The first hydraulic circuit 120a also includes a rear hydraulic line 136a that extends between and fluidly connects the first longitudinal hydraulic line 132a with the rebound valve 130 of the back right damper 102d and thus the fourth rebound chamber 128d. The first hydraulic circuit 120a further includes a first manifold conduit 138a that extends between and fluidly connects the first longitudinal hydraulic line 132a and the first manifold valve 122a. The second hydraulic circuit 120*b* includes a second longitudinal hydraulic line 132*b* that extends between and fluidly connects the compression valve 131 of the front right damper 102*b* and thus the second compression chamber 126*b* with the compression valve 131 of the back right damper 102*d* and thus the fourth compression chamber 126*d*. The second hydraulic circuit 120*b* includes a front hydraulic line 134*b* that extends between and fluidly connects the second longitudinal hydraulic line 132*b* with the rebound valve 130 of the front left damper 102*a* and thus the first rebound chamber 128*a*. The second hydraulic circuit 120*b* also includes a rear hydraulic line 136*b* that extends between and fluidly connects the second longitudinal hydraulic line 132*b* with the rebound valve 130 of the back left damper 102*c* and thus the third rebound chamber 128*c*. The second hydraulic circuit 120*b* further includes a second manifold conduit 138*b* that extends between and fluidly connects the second longitudinal hydraulic line 132*b* and the second manifold valve 122*b*.

It should be appreciated that the word "longitudinal" as used in the first and second longitudinal hydraulic lines 132*a*, 132*b* simply means that the first and second longitudinal hydraulic lines 132*a*, 132*b* run between the front dampers 102*a*, 102*b* and the back dampers 102*c*, 102*d* generally. The first and second longitudinal hydraulic lines 132*a*, 132*b* need not be linear or arranged in any particular direction as long as they ultimately connect the front dampers 102*a*, 102*b* and the back dampers 102*c*, 102*d*. It should also be appreciated that while in the illustrated example the various hydraulic lines are made of flexible tubing (e.g., hydraulic hoses), other conduit structures and/or fluid passageways can be utilized and therefore the term "line" is not limited to tubing or hydraulic hoses, but more generally refers to a fluid conduit.

The suspension system 100 illustrated in FIG. 1 includes eight fluid transfer flow paths 140*a*, 141*a*, 140*b*, 141*b*, 140*c*, 141*c*, 140*d*, 141*d* that fluidly couple the first and second hydraulic circuits 120*a*, 120*b* at each corner of the vehicle. The fluid transfer flow paths 140*a*, 141*a*, 140*b*, 141*b*, 140*c*, 141*c*, 140*d*, 141*d* are grouped into pairs (i.e., are arranged in groups of two, resulting in four sets of two fluid transfer flow paths) and the two fluid transfer flow paths in each pairing are arranged in parallel and extend through the damper housing 103 of each damper 102*a*, 102*b*, 102*c*, 102*d*. Thus, the eight fluid transfer flow paths 140*a*, 141*a*, 140*b*, 141*b*, 140*c*, 141*c*, 140*d*, 141*d* include a pair of front left fluid transfer flow paths 140*a*, 141*a* that are arranged in parallel with one another in the damper housing 103 of the front left damper 102*a* and extend between and fluidly connect the first longitudinal hydraulic line 132*a* of the first hydraulic circuit 120*a* and the front hydraulic line 134*b* of the second hydraulic circuit 120*b*, a pair of front right fluid transfer flow paths 140*b*, 141*b* that are arranged in parallel with one another in the damper housing 103 of the front right damper 102*b* and extend between and fluidly connect the front hydraulic line 134*a* of the first hydraulic circuit 120*a* and the second longitudinal hydraulic line 132*b* of the second hydraulic circuit 120*b*, a pair of back left fluid transfer flow paths 140*c*, 141*c* that are arranged in parallel with one another in the damper housing 103 of the back left damper 102*c* and extend between and fluidly connect the first longitudinal hydraulic line 132*a* of the first hydraulic circuit 120*a* and the rear hydraulic line 136*b* of the second hydraulic circuit 120*b*, and a pair of back right fluid transfer flow paths 140*d*, 141*d* that are arranged in parallel with one another in the damper housing 103 of the back right damper 102*d* and extend between and fluidly connect the rear hydraulic line 136*a* of the first hydraulic circuit 120*a* and the second longitudinal hydraulic line 132*b* of the second hydraulic circuit 120*b*.

A front left accumulator 142*a* is arranged in fluid communication with the first longitudinal hydraulic line 132*a* and is connected to the damper housing 103 of the front left damper 102*a*. A front right accumulator 142*b* is arranged in fluid communication with the second longitudinal hydraulic line 132*b* and is connected to the damper housing 103 of the front right damper 102*b*. A back left accumulator 142*c* is arranged in fluid communication with the first longitudinal hydraulic line 132*a* and is connected to the damper housing 103 of the back left damper 102*c*. A back right accumulator 142*d* is arranged in fluid communication with the second longitudinal hydraulic line 132*b* and is connected to the damper housing 103 of the back right damper 102*d*. Each of the accumulators 142*a*, 142*b*, 142*c*, 142*d* have a variable fluid volume chamber 143 that increases and decreases depending on the fluid pressure in the first and second longitudinal hydraulic lines 132*a*, 132*b*.

The suspension system 100 also includes eight frequency dependent valves 144*a*, 145*a*, 144*b*, 145*b*, 144*c*, 145*c*, 144*d*, 145*d* that are connected in-line (i.e., in series) with each of the fluid transfer flow paths 140*a*, 141*a*, 140*b*, 141*b*, 140*c*, 141*c*, 140*d*, 141*d*. Thus, the frequency dependent valves 144*a*, 145*a*, 144*b*, 145*b*, 144*c*, 145*c*, 144*d*, 145*d* are also grouped into pairs (i.e., are arranged in groups of two, resulting in four sets of two frequency dependent valves) and the two frequency dependent valves in each pairing are arranged in parallel with one another inside the damper housing 103 of each damper 102*a*, 102*b*, 102*c*, 102*d*. Thus, the eight frequency dependent valves 144*a*, 145*a*, 144*b*, 145*b*, 144*c*, 145*c*, 144*d*, 145*d* include a pair of front left frequency dependent valves 144*a*, 145*a* that are arranged in parallel with one another in the damper housing 103 of the front left damper 102*a* where frequency dependent valve 144*a* is connected along and in-line with fluid transfer flow path 140*a* and frequency dependent valve 145*a* is connected along and in-line with fluid transfer flow path 141*a*, a pair of front right frequency dependent valves 144*b*, 145*b* that are arranged in parallel with one another in the damper housing 103 of the front right damper 102*b* where frequency dependent valve 144*b* is connected along and in-line with fluid transfer flow path 140*b* and frequency dependent valve 145*b* is connected along and in-line with fluid transfer flow path 141*b*, a pair of back left frequency dependent valves 144*c*, 145*c* that are arranged in parallel with one another in the damper housing 103 of the back left damper 102*c* where frequency dependent valve 144*c* is connected along and in-line with fluid transfer flow path 140*c* and frequency dependent valve 145*c* is connected along and in-line with fluid transfer flow path 141*c*, and a pair of back right frequency dependent valves 144*d*, 145*d* that are arranged in parallel with one another in the damper housing 103 of the back right damper 102*d* where frequency dependent valve 144*d* is connected along and in-line with fluid transfer flow path 140*d* and frequency dependent valve 145*d* is connected along and in-line with fluid transfer flow path 141*d*.

The frequency dependent valves 144*a*, 145*a*, 144*b*, 145*b*, 144*c*, 145*c*, 144*d*, 145*d* are passive, mechanical one-way valves that are tuned to open in response to high frequency pressure changes in the hydraulic lines 132*a*, 132*b*, 134*a*, 134*b*, 136*a*, 136*b* when one or more of the dampers 102*a*, 102*b*, 102*c*, 102*d* encounter high frequency impacts (like pot-holes and bumps). The frequency dependent valves 144*a*, 145*a*, 144*b*, 145*b*, 144*c*, 145*c*, 144*d*, 145*d* remain closed during low frequency pressure changes in the hydraulic lines 132a, 132b, 134a, 134b, 136a, 136b, such as those experienced when the vehicle is turning/cornering.

Figure 2:
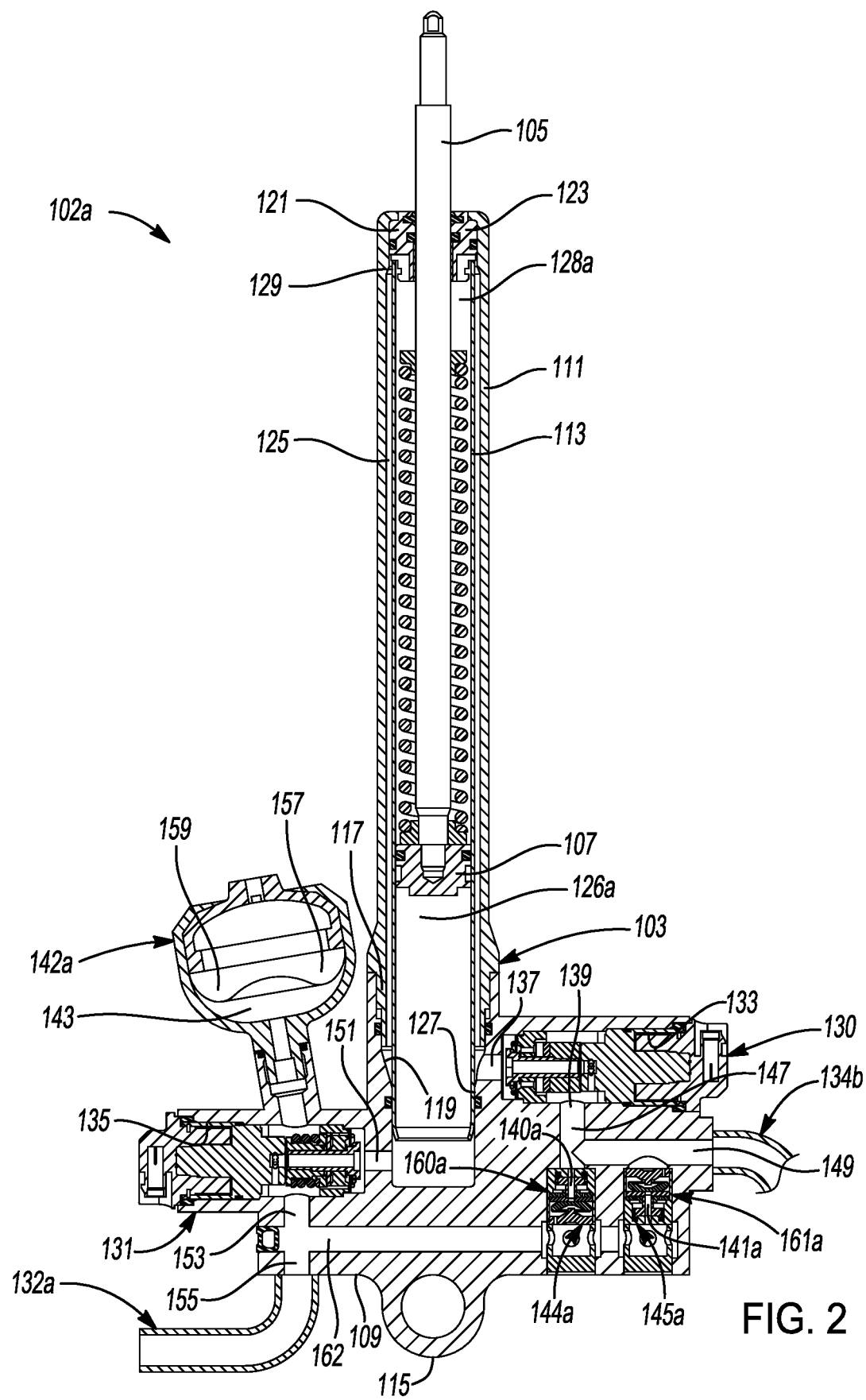
FIG. 2 is a side cross-section view of an exemplary damper of the suspension system shown in FIG. 1 with two exemplary frequency dependent roll stiffness valves.

FIG. 2 illustrates the front left damper 102a in greater detail. It should be appreciated that the other dampers 102b, 102c, 102d in the suspension system 100 have substantially the same structure illustrated in FIG. 2. As shown in FIG. 2, the damper housing 103 of the front left damper 102a includes a valve block 109, a reserve tube 111, and a pressure tube 113. The valve block 109 may optionally include an attachment structure 115 for attaching the damper 102a to the vehicle body or another component of the suspension system 100, such as a suspension knuckle or control arm. The reserve tube 111 has a first reserve tube end 117 that is received in a stepped bore 119 in the valve block 109 of the damper housing 103 and a second reserve tube end 121 that receives a piston rod guide 123. The piston rod 105 extends through the piston rod guide 123 and is permitted to slide up and down through the piston rod guide 123. The pressure tube 113 is co-axially arranged inside the reserve tube 111 and is radially inward of the reserve tube 111 such that a reservoir chamber 125 is defined in the annular space between the reserve tube 111 and the pressure tube 113. The pressure tube 113 has a first pressure tube end 127 that is also received in the stepped bore 119 of the valve block 109 of the damper housing 103 and a second pressure tube end 129 that is connected to the piston rod guide 123 in a press-fit. The piston 107 is arranged in sliding engagement with the inside of the pressure tube 113 such that the piston 107 divides the volume inside the pressure tube 113 of the front left damper 102a into a first compression chamber 126a and a first rebound chamber 128a. The first rebound chamber 128a is arranged in fluid communication with the reservoir chamber 125 between the reserve tube 111 and the pressure tube 113.

The rebound valve 130 of the front left damper 102a is at least partially received in a rebound valve cavity 133 in the valve block 109 of the damper housing 103 and the compression valve 131 of the front left damper 102a is at least partially received in a compression valve cavity 135 in the valve block 109 of the damper housing 103. The rebound valve 130 includes a first rebound valve port 137 that is arranged in fluid communication with the reservoir chamber 125 and a second rebound valve port 139 that is arranged in fluid communication with a first passageway 147 in the valve block 109 of the damper housing 103. The first passageway 147 in the valve block 109 of the front left damper 102a is connected in fluid communication with the front hydraulic line 134b of the second hydraulic circuit 120b via a second passageway 149 that extends between the first passageway 147 in the valve block 109 and the front hydraulic line 134b of the second hydraulic circuit 120b.

The compression valve 131 includes a first compression valve port 151 that is arranged in fluid communication with the first compression chamber 122a of the front left damper 102a and a second compression valve port 153 that is arranged in fluid communication with a third passageway 155 in the valve block 109 of the damper housing 103. The third passageway 155 in the valve block 109 of the front left damper 102a is connected in fluid communication with the first longitudinal hydraulic line 132a of the first hydraulic circuit 120a. The first accumulator 142a may be connected or mounted to the valve block 109 of the front left damper 102a and may be arranged in fluid communication with the second compression valve port 153 of the third passageway 155 in the valve block 109. The accumulator 142a may be constructed in a number of different ways. For example and without limitation, the accumulator 142a illustrated in FIG. 2 has a pressurized gas chamber 157 that is separated from the variable fluid volume chamber 143 by a flexible membranes 159.

The valve block 109 of the front left damper 102a has a first valve cavity 160a that receives frequency dependent valve 144a and a second valve cavity 161a that receives frequency dependent valve 145a. The first valve cavity 160a is arranged in fluid communication with the first passageway 147 and a bridge passageway 162 that extends within the valve block 109 to the third passageway 155. The second valve cavity 161a is arranged in fluid communication with the second passageway 149 and the bridge passageway 162. Fluid transfer flow path 140a is formed by and extends through the first passageway 147, the first valve cavity 160a, the bridge passageway 162, and the third passageway 155, while fluid transfer flow path 141a is formed by and extends through the first passageway 147, the second passageway 149, the second valve cavity 161a, the bridge passageway 162, and the third passageway 155. As will be explained in greater detail below, frequency dependent valve 144a only permits fluid flow through fluid transfer flow path 140a in one direction from the first passageway 147 to the bridge passageway 162 during high frequency impacts and frequency dependent valve 145a only permits fluid flow through fluid transfer flow path 141a in an opposite direction from the bridge passageway 162 to the second passageway 149 during high frequency impacts.

Figure 3:
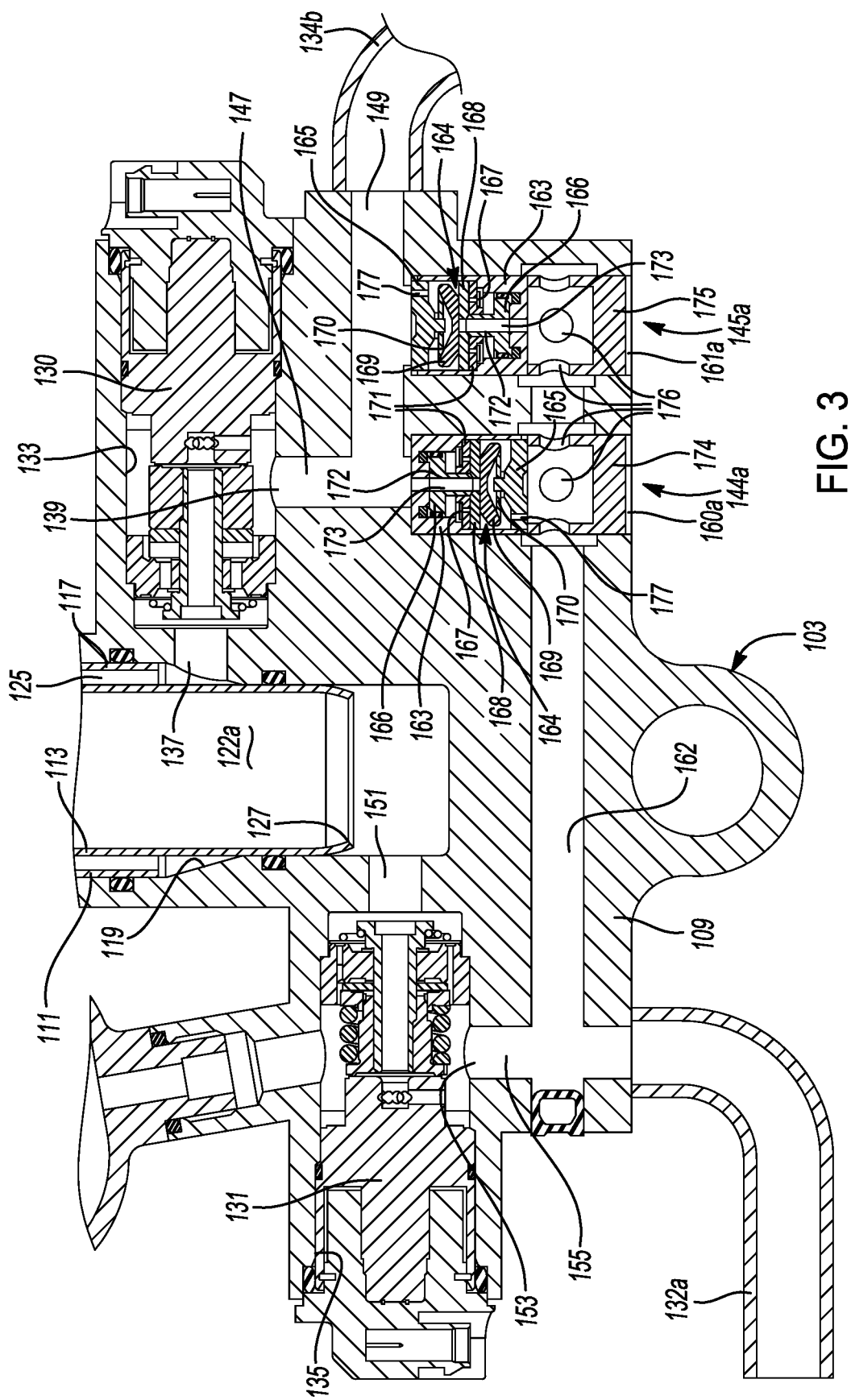
FIG. 3 is an enlarged side cross-section view of the exemplary damper of shown in FIG. 2 where the two exemplary frequency dependent roll stiffness valves are illustrated in greater detail.

As shown in FIG. 3, each frequency dependent valve 144a, 145a includes a valve housing 163, a spool valve assembly 164, and an end cap 165 that is threadingly or otherwise attached to valve housing 163. The spool valve assembly 164 includes a valve spool 166, a check valve 167, a valve disc 168, a spring seat 169, one or more spring discs 170, and a valve seat 171, which are all positioned in a stacked arrangement inside the valve housing 163. Valve spool 166, valve disc 168, and spring seat 169 are slidably disposed within the valve housing 163, while the valve seat 171 is fixedly attached to the valve housing 163. The valve spool 166 has a tubular stem 172 that extends through the center of the valve seat 171 in a sliding arrangement and contacts the valve disc 168, which is positioned between the spring seat 169 and the valve seat 171. The spring disc(s) 170 are disposed between the end cap 165 and the spring seat 169 to bias the spring seat 169 against the valve disc 168 and bias the valve disc 168 against both the valve seat 171 and the stem 172 of the valve spool 166. The tubular stem 172 of the valve spool defines an axial passage 173 that also extends through the valve housing 163 and the valve disc 168. Frequency dependent valve 144a includes a first ported body 174 that is disposed in the first valve cavity 160a in an abutting arrangement with the end cap 165 of frequency dependent valve 144a. Frequency dependent valve 145a includes a second ported body 175 that is disposed in the second valve cavity 161a in an abutting arrangement with the valve housing 163 of frequency dependent valve 145a. Both ported bodies 174, 175 have ports 176 that are arranged in fluid communication with the bridge passageway 162 in the valve block 109 of the damper housing 103. Thus, the spool valve assemblies 164 of the pair of front left frequency dependent valves 144a, 145a are vertically oriented in opposite directions where the axial passage 173 of frequency dependent valves 144a opens to the first passageway 147 in the valve block 109 of the damper housing 103 and the axial passage 173 of frequency dependent valves 145a opens to the bridge passageway 162 in the valve block 109 of the damper housing 103.

Figure 4:
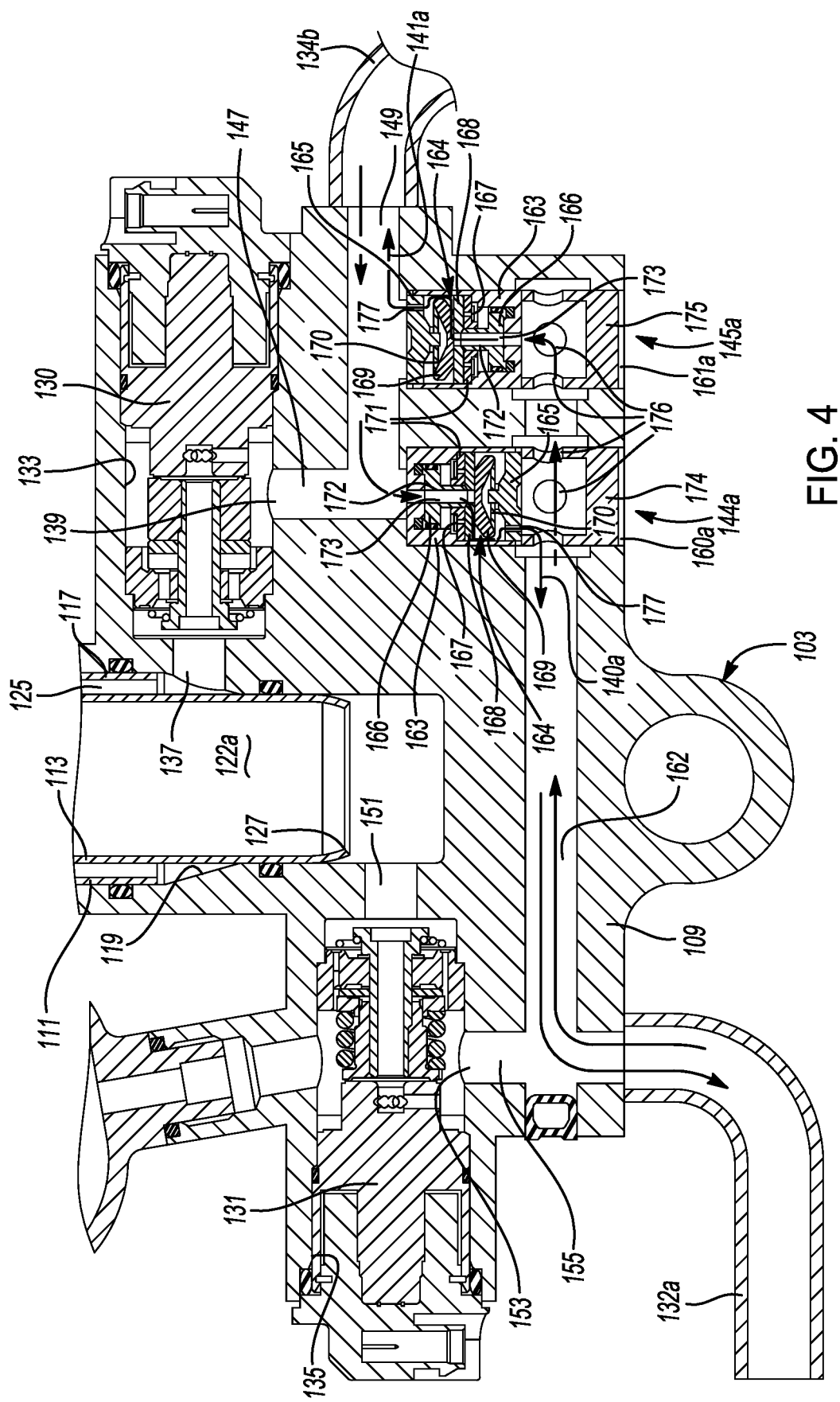
FIG. 4 is another enlarged side cross-section view of the exemplary damper of shown in FIG. 2 and illustrates fluid flow through the two exemplary frequency dependent roll stiffness valves.

FIG. 4 illustrates fluid flow through the pair of front left fluid transfer flow paths 140a, 141a in the front left damper 102a. When fluid pressure rapidly rises in the front hydraulic line 134b of the second hydraulic circuit 120b, such as when the front right damper 102b and/or back right damper 102d experience a high frequency impact (compression stroke), hydraulic fluid will flow through fluid transfer flow path 140a in the front left damper 102a, reducing unwanted suspension movements in the front left damper 102a that would otherwise be caused by hydraulic coupling. In other words, a high frequency pressure pulse in the front hydraulic line 134b of the second hydraulic circuit 120b will open frequency dependent valve 144a and will bypass the front left damper 102a by traveling through fluid transfer flow path 140a. When this occurs, hydraulic fluid in the front hydraulic line 134b of the second hydraulic circuit 120b enters the second passageway 149 and then the first passageway 147 in the valve block 109 of the damper housing 103 and enters the axial passage 173 in frequency dependent valve 144a. The fluid pressure in the axial passage 173 pushes the valve spool 166, valve disc 168, and spring seat 169 towards the end cap 165 against the biasing force of the spring disc(s) 170, opening frequency dependent valve 144a. Thus, the hydraulic fluid in the first passageway 147 can flow along fluid transfer flow path 140a by passing through the axial passage 173, through one or more orifices 177 in the end cap 165 of frequency dependent valve 144a, through the ports 176 in the first ported body 174 and into the bridge passageway 162, where the hydraulic fluid then flows to the third passageway 155 in the valve block 109 of the damper housing 103 and into the first longitudinal hydraulic line 132a.

When fluid pressure rapidly rises in the first longitudinal hydraulic line 132a, such as when the back left damper 102c experiences a high frequency impact (compression stroke), hydraulic fluid will flow through fluid transfer flow path 141a in the front left damper 102a, reducing unwanted suspension movements in the front left damper 102a that would otherwise be caused by hydraulic coupling. In other words, a high frequency pressure pulse in the first longitudinal hydraulic line 132a will open frequency dependent valve 145a and will bypass the front left damper 102a by traveling through fluid transfer flow path 141a. When this occurs, hydraulic fluid in the first longitudinal hydraulic line 132a enters the third passageway 155 in the valve block 109 of the damper housing 103, passes through the bridge passageway 162 and the ports 176 in the second ported body 175, and enters the axial passage 173 in frequency dependent valve 145a. The fluid pressure in the axial passage 173 pushes the valve spool 166, valve disc 168, and spring seat 169 towards the end cap 165 against the biasing force of the spring disc(s) 170, opening frequency dependent valve 145a. Thus, the hydraulic fluid in the bridge passageway 162 can flow along fluid transfer flow path 141a by passing through the ports 176 in the second ported body 175, through the axial passage 173, through one or more orifices 177 in the end cap 165 of frequency dependent valve 145a, and into the first passageway 147, where the hydraulic fluid then flows through the second passageway 149 in the valve block 109 of the damper housing 103 and into the front hydraulic line 134b of the second hydraulic circuit 120b.

The spring discs 170 are tuned such that the frequency dependent valves 144a, 145a, 144b, 145b, 144c, 145c, 144d, 145d will remain closed during low frequency (i.e., more gradual) pressure changes, such as those generated during corning, braking, and acceleration. Thus, the suspension system 100 provides passive roll resistance during cornering when the frequency dependent valves 144a, 145a, 144b, 145b, 144c, 145c, 144d, 145d are closed, while at the same time reducing unwanted cross-system reactions (e.g., lateral shake due to hydraulic coupling) when one or more of the dampers 102a, 102b, 102c, 102d encounter high frequency impacts (like pot-holes and bumps). Advantageously, the frequency dependent valves 144a, 145a, 144b, 145b, 144c, 145c, 144d, 145d do not require any wiring or control devices and are therefore less expensive that electromechanical valve implementations and are simpler to install.

However, it should be appreciated that while the frequency dependent valves 144a, 145a, 144b, 145b, 144c, 145c, 144d, 145d are passive, mechanical valves, the illustrated suspension system 100 can also provide active suspension control. The first pressure sensor 124a of the manifold assembly 104 is arranged to measure fluid pressure in the first manifold conduit 138a and the second pressure sensor 124b of the manifold assembly 104 is arranged to measure fluid pressure in the second manifold conduit 138b. When the vehicle is cornering, braking, or accelerating, the lateral and longitudinal acceleration is measured by one or more accelerometers (not shown) and the anti-roll torque to control the roll of the vehicle is calculated by the controller. Alternatively, the lateral and longitudinal acceleration of the vehicle can be computed by the controller based on a variety of different inputs, including without limitation, steering angle, vehicle speed, brake pedal position, and/or accelerator pedal position. The dampers 102a, 102b, 102c, 102d are used to provide forces that counteract the roll moment induced by the lateral acceleration, thus reducing the roll angle of the vehicle.

When the first and second manifold valves 122a, 122b are closed, the first and second hydraulic circuits 120a, 120b operate as a closed loop system, either together or separately depending on whether the frequency dependent valves 144a, 145a, 144b, 145b, 144c, 145c, 144d, 145d are open or closed, which is based on the frequency response of each valve 144a, 145a, 144b, 145b, 144c, 145c, 144d, 145d. When the first and/or second manifold valves 122a, 122b are open, the bi-directional pump 110 either adds or removes fluid from the first and/or second hydraulic circuits 120a, 120b. As will be explained in greater detail below, this enables the suspension system 100 to control the roll stiffness of the vehicle, which changes the degree to which the vehicle will lean to one side or the other during corning (i.e., roll)

For example, when the vehicle is put into a right-hand turn, the momentum of the sprung weight of the vehicle tends to make the vehicle lean left towards the outside of the turn, compressing the front left damper 102a and the back left damper 102c. When this occurs, fluid flows out from the first compression chamber 126a of the front left damper 102a and the third compression chamber 126c of the back left damper 102c into the first longitudinal hydraulic line 132a of the first hydraulic circuit 120a. As a result of the weight transfer to the left side of the vehicle, the front right damper 102b and back right damper 102d begin to extend, causing fluid to flow out of the second rebound chamber 128b of the front right damper 102b and the fourth compression chamber 126d of the back right damper 102d into the front and rear hydraulic lines 134a, 136a of the first hydraulic circuit 120a. If there are no high frequency impacts on the dampers 102a, 102b, 102c, 102d, the frequency dependent valves 144a, 145a, 144b, 145b, 144c, 145c, 144d, 145d will remain closed. Fluid flows out of the first compression chamber 126a of the front left damper 102a, out of the third compression chamber 126c of the back left damper 102c, out of the second rebound chamber 128b of the front right damper 102b, and out of the fourth rebound chamber 128d of the back right damper 102d and into the front and rear hydraulic lines 134a, 136a of the first hydraulic circuit 120a, which increases the pressure in the front left and back left accumulators 142a, 142c and provides passive roll resistance where it becomes increasingly more difficult to compress the front left damper 102a and the back left damper 102c since the first compression chamber 126a of the front left damper 102a and the third compression chamber 126c of the back left damper 102c are connected in fluid communication with the first hydraulic circuit 120a. At the same time, fluid flows out of front right and back right accumulators 142b, 142d and into the first rebound chamber 128a of the front left damper 102a, into the third rebound chamber 128c of the back left damper 102c, into the second compression chamber 126b of the front right damper 102b, and into the fourth compression chamber 126d of the back right damper 102d. The resulting pressure difference between the dampers 102a, 102b, 102c, 102d generates damper forces that counteract or resist the roll moment of the vehicle.

The opposite is true when the vehicle is put into a left-hand turn, where the momentum of the sprung weight of the vehicle tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second longitudinal hydraulic line 132b of the second hydraulic circuit 120b. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the front and rear hydraulic lines 134b, 136b of the second hydraulic circuit 120b. Again, if there are no high frequency impacts on the dampers 102a, 102b, 102c, 102d, the frequency dependent valves 144a, 145a, 144b, 145b, 144c, 145c, 144d, 145d will remain closed. Fluid flows out of the second compression chamber 126b of the front right damper 102b, out of the fourth compression chamber 126d of the back right damper 102d, out of the first rebound chamber 128a of the front left damper 102a, and out of the third rebound chamber 128c of the back left damper 102c and into the front and rear hydraulic lines 134b, 136b of the second hydraulic circuit 120b, which increases the pressure in the front right and back right accumulators 142b, 142d and provides passive roll resistance where it becomes increasingly more difficult to compress the front right damper 102b and the back right damper 102d since the second compression chamber 126b of the front right damper 102b and the fourth compression chamber 126d of the back right damper 102d are connected in fluid communication with the second hydraulic circuit 120b. At the same time, fluid flows out of front left and back left accumulators 142a, 142c and into the second rebound chamber 128b of the front right damper 102b, into the fourth rebound chamber 128d of the back right damper 102d, into the first compression chamber 126a of the front left damper 102a, and into the third compression chamber 126c of the back left damper 102c. The resulting pressure difference between the dampers 102a, 102b, 102c, 102d generates damper forces that counteract or resist the roll moment of the vehicle.

When one or more of the dampers 102a, 102b, 102c, 102d encounter high frequency impacts (like pot-holes and bumps), one or more of the frequency dependent valves 144a, 145a, 144b, 145b, 144c, 145c, 144d, 145d open to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left damper 102a undergoes a high frequency compression stroke as the front left wheel hits a bump, fluid may flow from the first compression chamber 126a of the front left damper 102a into the first longitudinal hydraulic line 132a, causing a high frequency pressure change in the first longitudinal hydraulic line 132a that causes frequency dependent valve 145a to open. When this occurs, fluid in the first longitudinal hydraulic line 132a can pass through fluid transfer flow path 141a and frequency dependent valve 145a and flow into the first rebound chamber 128a of the front left damper 102a. In other words, when frequency dependent valve 145a opens, fluid can travel from the first compression chamber 126a to the first rebound chamber 128a of the front left damper 102a with the only restriction coming from the rebound and compression valves 130, 131 of the front left damper 102a. As such, when the frequency dependent valves 144a, 145a, 144b, 145b, 144c, 145c, 144d, 145d open, the dampers 102a, 102b, 102c, 102d are effectively decoupled from one another so that a high frequency impact on one damper does not cause an unwanted response in another damper for improved ride comfort.

Figure 5:
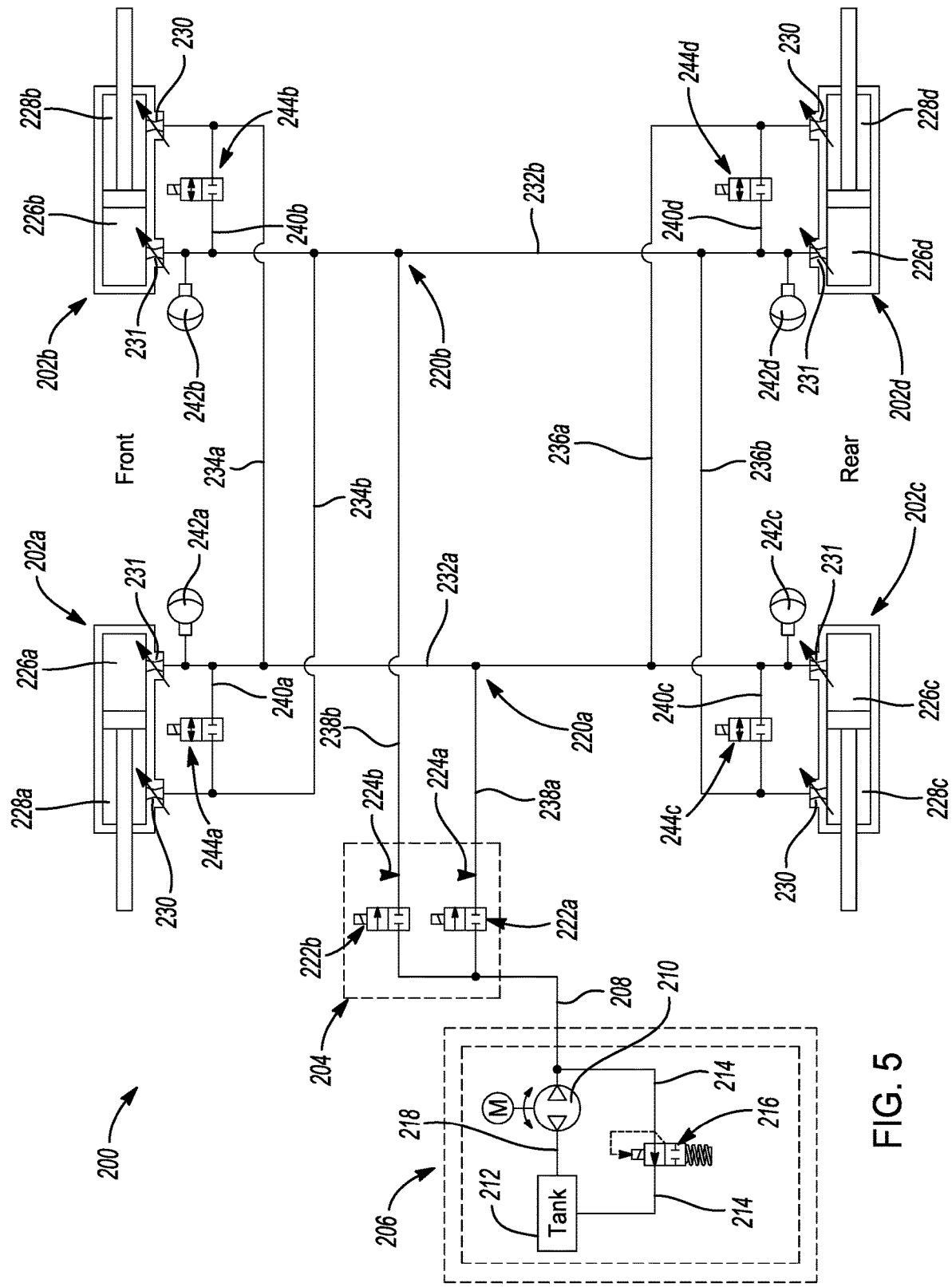
FIG. 5 is a schematic diagram illustrating another exemplary suspension system of the present disclosure that includes four bi-directional frequency dependent roll stiffness valves with one at each damper.
Figure 6:
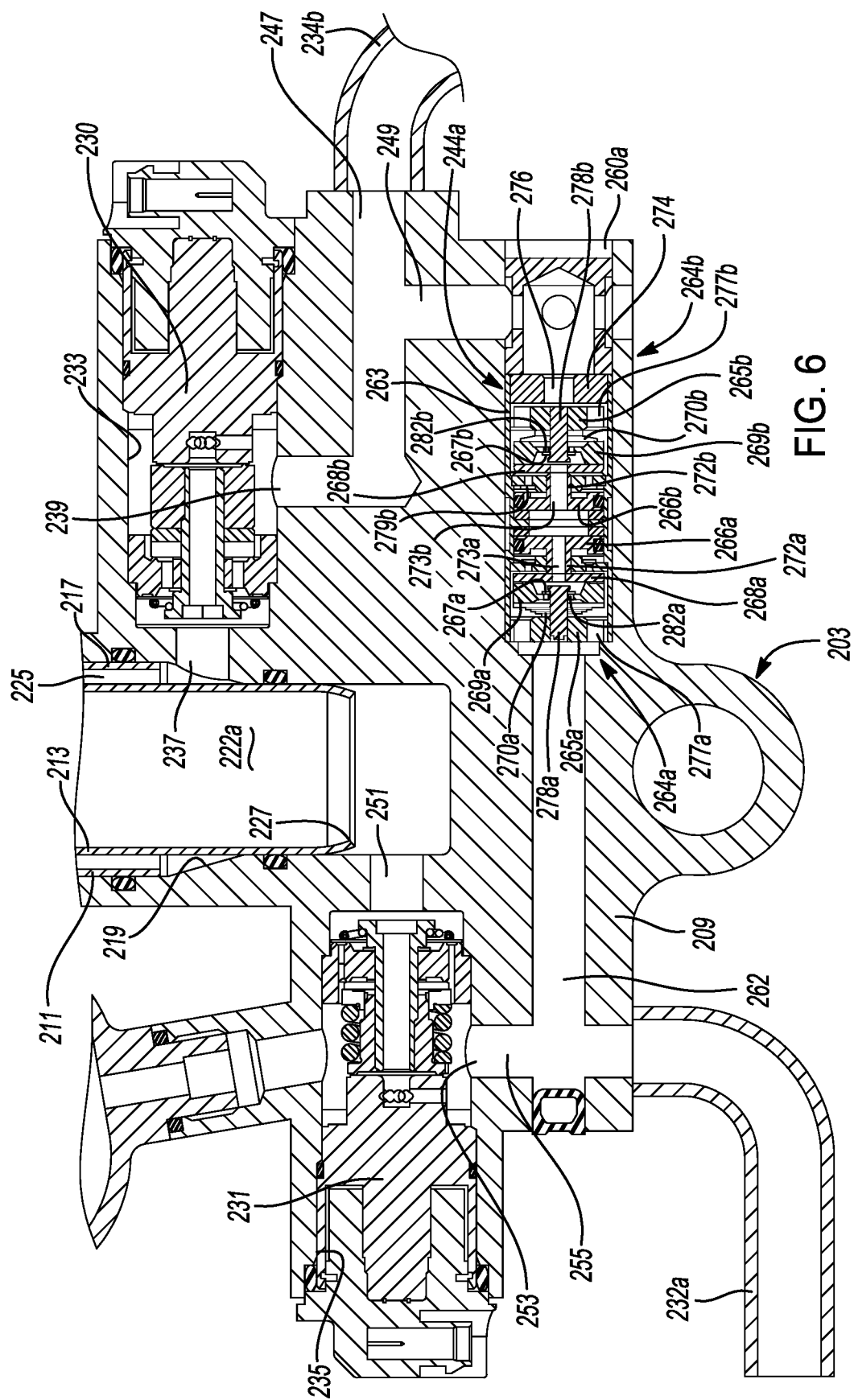
FIG. 6 is an enlarged side cross-section view of an exemplary damper of the suspension system shown in FIG. 5 with an exemplary bi-directional frequency dependent roll stiffness valve.
Figure 7:
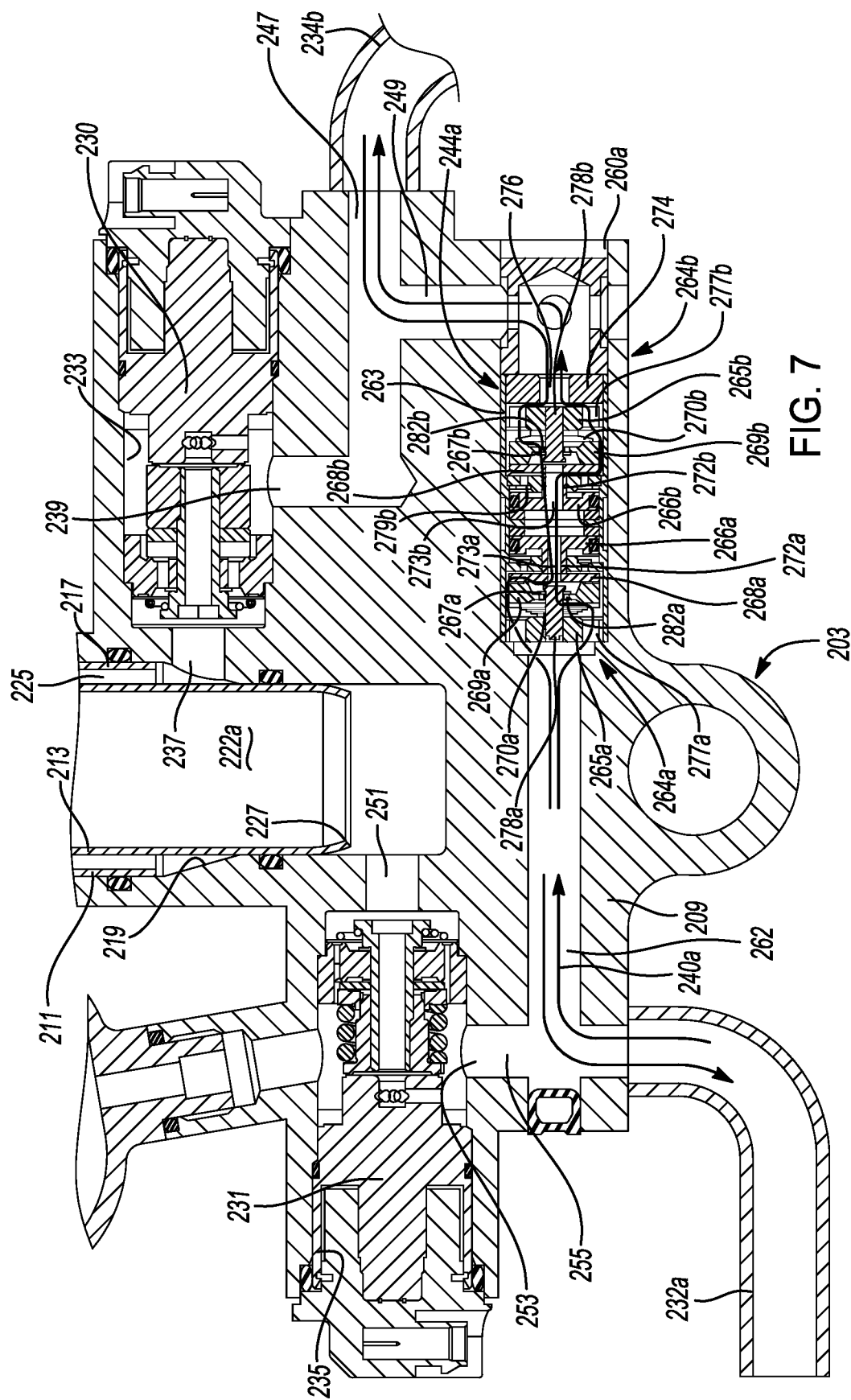
FIG. 7 is another enlarged side cross-section view of the exemplary damper of shown in FIG. 6 and illustrates fluid flow through the exemplary bi-directional frequency dependent roll stiffness valve.

FIGS. 5-7 illustrate another suspension system 200 that shares many of the same components as the suspension system 100 illustrated in FIGS. 1-4, but in FIGS. 5-7 four bi-directional frequency dependent valves 244a, 244b, 244c, 244d replace the eight frequency dependent valves 144a, 145a, 144b, 145b, 144c, 145c, 144d, 145d illustrated in FIGS. 1-4. Rather than repeat the description set forth above, the following paragraphs describe the structure and function of the components in FIGS. 5-7 that are new and/or different from those shown and described in connection with FIGS. 1-4. It should be appreciated that the reference numbers in FIGS. 1-4 are "100" series numbers (e.g., 100, 102, 104, etc.) whereas the components in FIGS. 5-7 that are the same or similar to the components of the suspension system 100 shown in FIGS. 1-4 share the same base reference numbers, but are listed as "200" series numbers (e.g., 200, 202, 204, etc.). Thus, the same description for element 100 above applies to element 200 in FIGS. 5-7 and so on and so forth.

The suspension system 200 illustrated in FIG. 5 includes four fluid transfer flow paths 240a, 240b, 240c, 240d that fluidly couple the first and second hydraulic circuits 220a, 220b at each corner of the vehicle (i.e., at a location near each damper 202a, 202b, 202c, 202d). The four fluid transfer flow paths 240a, 240b, 240c, 240d include a front left fluid transfer flow path 240a that extends through the damper housing 203 of the front left damper 202a and fluidly connects the first longitudinal hydraulic line 232a of the first hydraulic circuit 220a and the front hydraulic line 234b of the second hydraulic circuit 220b, a front right fluid transfer flow path 240b that extends through the damper housing 203 of the front right damper 202b and fluidly connects the front hydraulic line 234a of the first hydraulic circuit 220a and the second longitudinal hydraulic line 232b of the second hydraulic circuit 220b, a back left fluid transfer flow path 240c that extends through the damper housing 203 of the back left damper 202c and fluidly connects the first longitudinal hydraulic line 232a of the first hydraulic circuit 220a and the rear hydraulic line 236b of the second hydraulic circuit 220*b*, and a back right fluid transfer flow path 240*d* that extends through the damper housing 203 of the back right damper 202*d* and fluidly connects the rear hydraulic line 236*a* of the first hydraulic circuit 220*a* and the second longitudinal hydraulic line 232*b* of the second hydraulic circuit 220*b*.

The suspension system 200 includes four bi-directional frequency dependent valves 244*a*, 244*b*, 244*c*, 244*d* that are connected in-line (i.e., in series) with each of the fluid transfer flow paths 240*a*, 240*b*, 240*c*, 240*d*. A front left frequency dependent valve 244*a* is positioned in-line with and controls fluid flow through the front left fluid transfer flow path 240*a* in two opposed directions. A front right frequency dependent valve 244*b* is positioned in-line with and controls fluid flow through the front right fluid transfer flow path 140*b* in two opposed directions. A back left frequency dependent valve 244*c* is positioned in-line with and controls fluid flow through the back left fluid transfer flow path 240*c* in two opposed directions. A back right frequency dependent valve 244*d* is positioned in-line with and controls fluid flow through the back right fluid transfer flow path 140*d* in two opposed directions. The frequency dependent valves 244*a*, 244*b*, 244*c*, 244*d* have passive spring-disk elements that are tuned to open in response to high frequency pressure changes in the hydraulic lines 232*a*, 232*b*, 234*a*, 234*b*, 236*a*, 236*b* when one or more of the dampers 202*a*, 202*b*, 202*c*, 202*d* encounter high frequency impacts (like pot-holes and bumps). The passive spring-disk elements of the frequency dependent valves 244*a*, 244*b*, 244*c*, 244*d* remain closed during low frequency pressure changes in the hydraulic lines 232*a*, 232*b*, 234*a*, 234*b*, 236*a*, 236*b*, such as those experienced when the vehicle is turning/cornering.

FIG. 6 illustrates the front left frequency dependent valve 244*a* in greater detail. It should be appreciated that the other frequency dependent valves 244*b*, 244*c*, 244*d* in the suspension system 200 have substantially the same structure illustrated in FIG. 6. As shown in FIG. 6, the valve block 209 of the front left damper 202*a* has a valve cavity 260*a* that receives the bi-directional frequency dependent valve 244*a*. The valve cavity 260*a* is arranged in fluid communication with the second passageway 247 and the bridge passageway 262. The second passageway 247 extends within the valve block 209 of the damper housing 203 between the valve cavity 260*a* and the first passageway 247, which is arranged in fluid communication with the second rebound valve port 239 and the front hydraulic line 234*b* of the second hydraulic circuit 220*b*. The bridge passageway 262 extends within the valve block 209 of the damper housing 203 between the valve cavity 260*a* and the third passageway 155, which is arranged in fluid communication with the first longitudinal hydraulic line 232*a*. Thus, a bi-directional fluid transfer flow path 140*a* is formed by and extends through the first passageway 247, the second passageway 249, the valve cavity 260*a*, the bridge passageway 262, and the third passageway 255, through which fluid can flow in two opposed directions from the first longitudinal hydraulic line 232*a* to the front hydraulic line 234*b* of the second hydraulic circuit 220*b* or from the front hydraulic line 234*b* of the second hydraulic circuit 220*b* to the first longitudinal hydraulic line 232*a*. As will be explained in greater detail below, the bi-directional frequency dependent valve 244*a* only permits fluid flow through the fluid transfer flow path 240*a* during high frequency impacts.

As shown in FIG. 6, the frequency dependent valve 244*a* includes a valve housing 263, a first spool valve assembly 264*a*, and a second spool valve assembly 264*b*. Each spool valve assembly 264*a*, 264*b* includes a valve spool 266*a*, 266*b*, a check valve 267*a*, 267*b*, a valve disc 268*a*, 268*b*, a spring seat 269*a*, 269*b*, one or more spring discs 270*a*, 270*b*, a valve seat 271*a*, 271*b*, and an end cap 265*a*, 265*b* that is threadingly or otherwise attached to valve housing 263. Each valve spool 266*a*, 266*b*, valve disc 268*a*, 268*b*, and spring seat 269*a*, 269*b* is slidably disposed within the valve housing 263, while the valve seats 271*a*, 271*b* are fixedly attached to the valve housing 263. Each valve spool 266*a*, 266*b* has a tubular stem 272*a*, 272*b* that extends through the center of each respective valve seat 271*a*, 271*b* in a sliding arrangement and contacts each respective valve disc 268*a*, 268*b*, which are positioned between the spring seats 269*a*, 269*b* and the valve seats 271*a*, 271*b*. The spring discs 270*a*, 270*b* are disposed between the end caps 265*a*, 265*b* and the spring seats 269*a*, 269*b* to bias the spring seats 269*a*, 269*b* against the valve discs 268*a*, 268*b* and bias the valve discs 268*a*, 268*b* against the valve seats 271*a*, 271*b* and the stem 272*a*, 272*b* of the each valve spool 266*a*, 266*b*. The tubular stem 272*a*, 272*b* of each valve spool defines an axial passage 273*a*, 273*b*. A ported body 274 is positioned directly adjacent to the end cap 265*b* of the second spool valve assembly 264*b* and includes a central port 276 that is arranged in fluid communication with the second passageway 249 in the valve block 209 of the damper housing 203. Each end cap 265*a*, 265*b* includes one or more orifices 277*a*, 277*b* that pass through the end cap 265*a*, 265*b*. Each spool valve assembly 264*a*, 264*b* includes a retention stud 278*a*, 278*b*, which extends through the center of the spring seats 269*a*, 269*b*, the spring discs 270*a*, 270*b*, and the end caps 265*a*, 265*b*. The retention studs 278*a*, 278*b* may be rivets, for example, and retain the spring seats 269*a*, 269*b* and the spring discs 270*a*, 270*b* on the end caps 265*a*, 265*b* while permitting some limited axial movement of the spring seats 269*a*, 269*b* relative to the end caps 265*a*, 265*b*.

Each spool valve assembly 264*a*, 264*b* includes one or more valve plates 279*a*, 279*b* that open and close one or more holes 280*a*, 280*b* extending through the valve seat 271*a*, 271*b*. The valve plates 279*a*, 279*b* allow hydraulic fluid to flow through the holes 280*a*, 280*b* in the valve seat 271*a*, 271*b* and into a chamber 281*a*, 281*b* defined between the valve seat 271*a*, 271*b* and the valve spool 281*a*, 281*b*.

The check valve 267*a* of the first spool valve assembly 264*a* controls fluid flow through one or more apertures 282*a* that extend through the spring seat 269*a*. Therefore the check valve 267*a* of the first spool valve assembly 264*a* allows hydraulic fluid to flow through the first spool valve assembly 264*a* to the second spool valve assembly 264*b* when the valve disc 268*a* of the first spool valve assembly 264*a* is seated against the valve seat 271*a* (i.e., when the first spool valve assembly 264*a* is closed), but prohibits fluid flow in the opposite direction from the second spool valve assembly 264*b* to the bridge passageway 262. As will be explained below, fluid flow through the first spool valve assembly 264*a* in this opposite direction only occurs when there is a rapid rise in fluid pressure that forces the valve spool 266*a* to slide axially and push the valve disc 268*a* away from the valve seat 271*a* of the first spool valve assembly 264*a*.

The check valve 267*b* of the second spool valve assembly 264*b* controls fluid flow through one or more apertures 282*b* that extend through the spring seat 269*b*. Therefore the check valve 267*b* of the second spool valve assembly 264*b* allows hydraulic fluid to flow through the second spool valve assembly 264*b* to the first spool valve assembly 264*a* when the valve disc 268*b* of the second spool valve assembly 264*b* is seated against the valve seat 271*b* (i.e., when the second spool valve assembly 264b is closed), but prohibits fluid flow in the opposite direction from the first spool valve assembly 264a to the central port 276 in the ported body 274. As will be explained below, fluid flow through the second spool valve assembly 264b in this opposite direction only occurs when there is a rapid rise in fluid pressure that forces the valve spool 266b to slide axially and push the valve disc 268b away from the valve seat 271b of the second spool valve assembly 264b.

FIG. 7 illustrates fluid flow through the front left fluid transfer flow path 240a in the front left damper 202a, which as previously stated, may flow in one direction from the first longitudinal hydraulic line 232a to the front hydraulic line 234b of the second hydraulic circuit 220b or in the opposite direction from the front hydraulic line 234b of the second hydraulic circuit 220b to the first longitudinal hydraulic line 232a, provided that a rapid (i.e., high frequency) change in fluid pressure occurs to open the bi-directional frequency dependent valve 244a. For example, when fluid pressure rapidly rises in the front hydraulic line 234b of the second hydraulic circuit 220b, such as when the front right damper 202b and/or back right damper 202d experience a high frequency impact (compression stroke), hydraulic fluid will flow through fluid transfer flow path 240a in the front left damper 202a, reducing unwanted suspension movements in the front left damper 202a that would otherwise be caused by hydraulic coupling. In other words, a high frequency pressure pulse in the front hydraulic line 234b of the second hydraulic circuit 220b will open the first spool valve assembly 264a of the bi-directional frequency dependent valve 244a and will bypass the front left damper 202a by traveling through the fluid transfer flow path 240a in a direction going from the front hydraulic line 234b of the second hydraulic circuit 220b to the first longitudinal hydraulic line 232a. When this occurs, hydraulic fluid in the front hydraulic line 234b of the second hydraulic circuit 220b enters the first passageway 247 and then the second passageway 249 in the valve block 209 of the damper housing 203. The hydraulic fluid then flows into the central port 276 in the ported body 274 and through the orifices 277b in the end cap 265b of the second spool valve assembly 264b. From there, the hydraulic fluid flows through the apertures 282b in the spring seat 269b of the second spool valve assembly 264b, opens check valve 267b, and passes through the axial passage 273b in the valve spool 266b of the second spool valve assembly 264b. The hydraulic fluid flows from the axial passage 273b in the valve spool 266b of the second spool valve assembly 264b and enters the axial passage 273a in the valve spool 266a of the first spool valve assembly 264a. The fluid pressure in the axial passage 273a in the valve spool 266a of the first spool valve assembly 264a pushes the valve spool 266a, valve disc 268a, and spring seat 269a of the first spool valve assembly 264a towards the end cap 265a against the biasing force of the spring disc(s) 270a, opening the first spool valve assembly 264a and allowing the hydraulic fluid in the axial passage 273a of the valve spool 266a to flow to and through the orifices 277a in the end cap 265a of the first spool valve assembly 264a and into the bridge passageway 262, where the hydraulic fluid then flows to the third passageway 255 in the valve block 209 of the damper housing 203 and into the first longitudinal hydraulic line 232a.

When fluid pressure rapidly rises in the first longitudinal hydraulic line 232a, such as when the back left damper 202c experiences a high frequency impact (compression stroke), hydraulic fluid will flow through fluid transfer flow path 240a in the opposite direction, again reducing unwanted suspension movements in the front left damper 202a that would otherwise be caused by hydraulic coupling. In other words, a high frequency pressure pulse in the first longitudinal hydraulic line 232a will open the second spool valve assembly 264b of the bi-directional frequency dependent valve 244a and will bypass the front left damper 202a by traveling through the fluid transfer flow path 240a from the first longitudinal hydraulic line 232a to the front hydraulic line 234b of the second hydraulic circuit 220b. When this occurs, hydraulic fluid in the first longitudinal hydraulic line 232a enters the third passageway 255 in the valve block 209 of the damper housing 203, passes through the bridge passageway 262, and flows into the orifices 277a in the end cap 265a of the first spool valve assembly 264a. From there, the hydraulic fluid flows through the apertures 282a in the spring seat 269a of the first spool valve assembly 264a, opens check valve 267a, and passes through the axial passage 273a in the valve spool 266a of the first spool valve assembly 264a. The hydraulic fluid flows from the axial passage 273a in the valve spool 266a of the first spool valve assembly 264a and enters the axial passage 273b in the valve spool 266b of the second spool valve assembly 264b. The fluid pressure in the axial passage 273b in the valve spool 266b of the second spool valve assembly 264b pushes the valve spool 266b, valve disc 268b, and spring seat 269b of the second spool valve assembly 264b towards the end cap 265b against the biasing force of the spring disc(s) 270b, opening the second spool valve assembly 264b and allowing the hydraulic fluid in the axial passage 273b of the valve spool 266b to flow to and through the orifices 277b in the end cap 265b of the second spool valve assembly 264b and into the second passageway 249, where the hydraulic fluid then flows to the first passageway 247 in the valve block 209 of the damper housing 203 and into the front hydraulic line 234b of the second hydraulic circuit 220b.

The spring discs 270a, 270b are tuned such that the first and second spool valve assemblies 264a, 264b of the bi-directional frequency dependent valves 244a, 244b, 244c, 244d will remain closed during low frequency (i.e., more gradual) pressure changes, such as those generated during corning, braking, and acceleration. Thus, the suspension system 200 provides passive roll resistance during cornering when the bi-directional frequency dependent valves 244a, 244b, 244c, 244d are closed, while at the same time reducing unwanted cross-system reactions (e.g., lateral shake due to hydraulic coupling) when one or more of the dampers 202a, 202b, 202c, 202d encounter high frequency impacts (like pot-holes and bumps).

Figure 8:
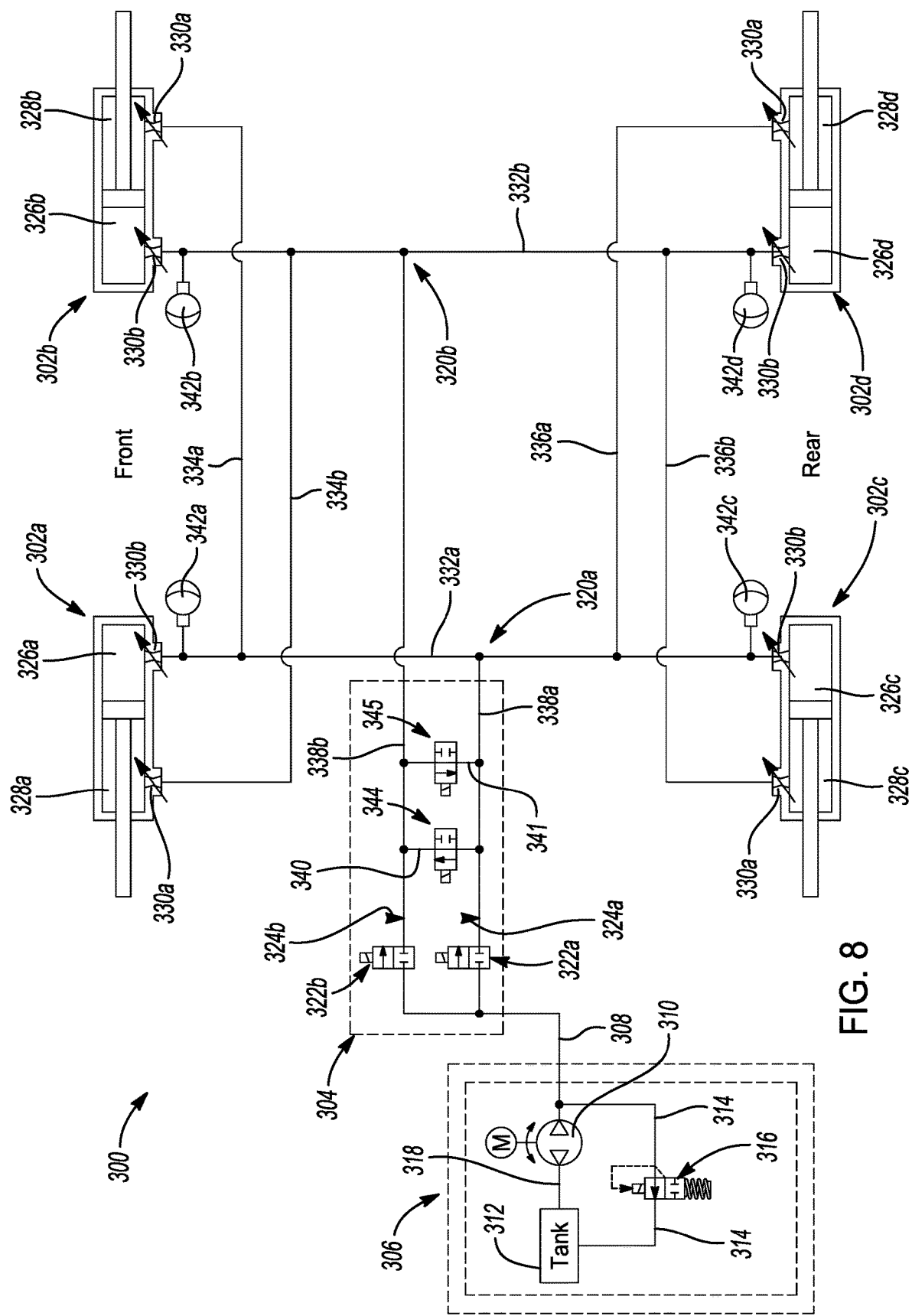
FIG. 8 is a schematic diagram illustrating another exemplary suspension system of the present disclosure that includes a manifold assembly with two frequency dependent roll stiffness valves.
Figure 9:
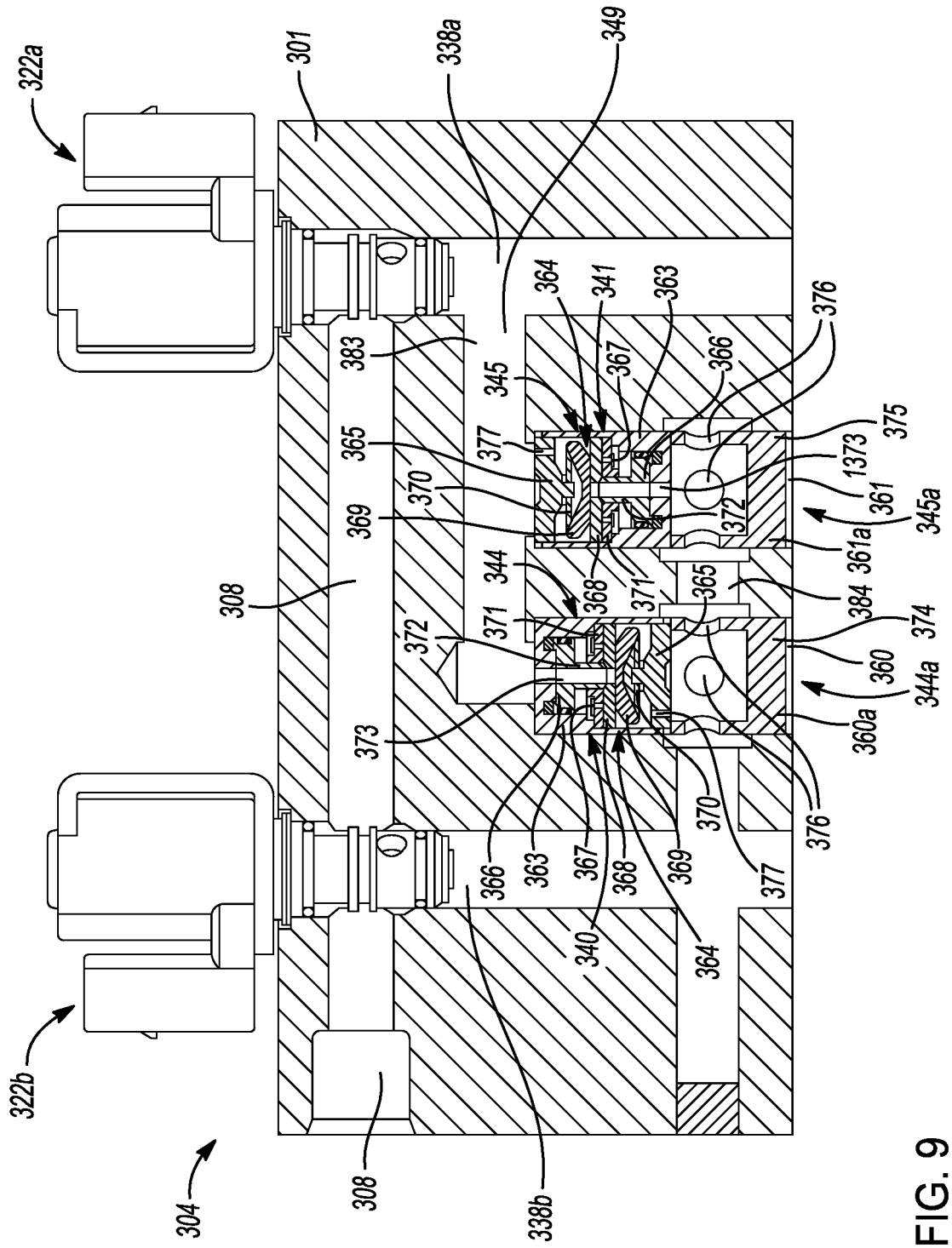
FIG. 9 is a side cross-section view of a portion of the manifold assembly shown in FIG. 8 where the two exemplary frequency dependent roll stiffness valves are illustrated in greater detail.

FIGS. 8 and 9 illustrate another suspension system 300 that shares many of the same components as the suspension systems 100, 200 illustrated in FIGS. 1-4 and FIGS. 5-7, but in FIGS. 8 and 9 two frequency dependent valves 344, 345 positioned in the manifold assembly 304 replace the four frequency dependent valves 244a, 244b, 244c, 244d illustrated in FIGS. 5-7. Because the four frequency dependent valves 244a, 244b, 244c, 244d shown in FIGS. 5-7 have been replaced with the two frequency dependent valves 344, 345, the four fluid transfer flow paths 240a, 240b, 240c, 240d shown in FIGS. 5-7 have been eliminated in the dampers 302a, 302b, 302c, 302d of the suspension system 300 shown in FIGS. 8 and 9. The two frequency dependent valves 344, 345 in FIGS. 8 and 9 have the same construction as the frequency dependent valves 144a, 145a shown in FIGS. 2-4, but the two frequency dependent valves 344, 345 in FIGS. 8 and 9 are positioned in a manifold block 301 of the manifold assembly 304 instead of in the valve block 109 of a damper 102a, 102b, 102c, 102d. Rather than repeat the description set forth above, the following paragraphs describe the structure and function of the components in FIGS. 8 and 9 that are new and/or different from those shown and described in connection with FIGS. 1-4 and FIGS. 5-7. It should be appreciated that the reference numbers in FIG. 5 are "200" series numbers (e.g., 200, 202, 204, etc.) whereas the components in FIGS. 8 and 9 that are the same or similar to the components of the suspension systems 100, 200 shown in FIGS. 1-4 and FIGS. 5-7 share the same base reference numbers, but are listed as "300" series numbers (e.g., 300, 302, 304, etc.). Thus, the same description for element 100 and 200 above applies to element 300 in FIGS. 8 and 9 and so on and so forth.

The suspension system 300 illustrated in FIGS. 8 and 9 includes a manifold assembly 304 with first and second manifold valves 322a, 322b that are arranged in fluid communication with a pump hydraulic line 308. The first manifold valve 322a is also arranged in fluid communication with a first manifold conduit 338a and the second manifold valve 322b is also arranged in fluid communication with a second manifold conduit 338b. The first manifold conduit 338a is arranged in fluid communication with the first longitudinal hydraulic line 332a and the second manifold conduit 338b is arranged in fluid communication with the second longitudinal hydraulic line 332b. The manifold assembly 304 further comprises first and second fluid transfer flow paths 340, 341 that extend between and connected the first and second manifold conduits 338a, 338b. The first one-way frequency dependent valve 344 is arranged along and connected in-line with the first fluid transfer flow path 340 and the second one-way frequency dependent valve 345 is arranged along and connected in-line with the second fluid transfer flow path 341. Therefore, the first and second frequency dependent valves 344, 345 control fluid flow between the first and second manifold conduits 338a, 338b and therefore fluid flow between the first and second hydraulic circuits 320a, 320b of the suspension system 300.

When the first and second manifold valves 322a, 322b are closed, the first and second hydraulic circuits 320a, 320b operate as a closed loop system, either together or separately depending on whether the frequency dependent valves 344, 345 are open or closed, which is based on the frequency response of the valves 344, 345. When the first and/or second manifold valves 322a, 322b are open, the bi-directional pump 310 either adds or removes fluid from the first and/or second hydraulic circuits 320a, 320b. As will be explained in greater detail below, this enables the suspension system 300 to control the roll stiffness of the vehicle, which changes the degree to which the vehicle will lean to one side or the other during corning (i.e., roll)

For example, when the vehicle is put into a right-hand turn, the momentum of the sprung weight of the vehicle tends to make the vehicle lean left towards the outside of the turn, compressing the front left damper 302a and the back left damper 302c. When this occurs, fluid flows out from the first compression chamber 326a of the front left damper 302a and the third compression chamber 326c of the back left damper 302c into the first longitudinal hydraulic line 332a of the first hydraulic circuit 320a. As a result of the weight transfer to the left side of the vehicle, the front right damper 302b and back right damper 302d begin to extend, causing fluid to flow out of the second rebound chamber 328b of the front right damper 302b and the fourth compression chamber 326d of the back right damper 302d into the front and rear hydraulic lines 334a, 336a of the first hydraulic circuit 320a. If there are no high frequency impacts on the dampers 302a, 302b, 302c, 302d, the frequency dependent valves 344, 345 will remain closed. Fluid flows out of the first compression chamber 326a of the front left damper 302a, out of the third compression chamber 326c of the back left damper 302c, out of the second rebound chamber 328b of the front right damper 302b, and out of the fourth rebound chamber 328d of the back right damper 302d and into the front and rear hydraulic lines 334a, 336a of the first hydraulic circuit 320a, which increases the pressure in the front left and back left accumulators 342a, 342c and provides passive roll resistance where it becomes increasingly more difficult to compress the front left damper 302a and the back left damper 302c since the first compression chamber 326a of the front left damper 302a and the third compression chamber 326c of the back left damper 302c are connected in fluid communication with the first hydraulic circuit 320a. At the same time, fluid flows out of front right and back right accumulators 342b, 342d and into the first rebound chamber 328a of the front left damper 302a, into the third rebound chamber 328c of the back left damper 302c, into the second compression chamber 326b of the front right damper 302b, and into the fourth compression chamber 326d of the back right damper 302d. The resulting pressure difference between the dampers 302a, 302b, 302c, 302d generates damper forces that counteract or resist the roll moment of the vehicle.

The opposite is true when the vehicle is put into a left-hand turn, where the momentum of the sprung weight of the vehicle tends to make the vehicle lean right towards the outside of the turn, compressing the front right damper 302b and the back right damper 302d. When this occurs, fluid flows out from the second compression chamber 326b of the front right damper 302b and the fourth compression chamber 326d of the back right damper 302d into the second longitudinal hydraulic line 332b of the second hydraulic circuit 320b. As a result of the weight transfer to the right side of the vehicle, the front left damper 302a and back left damper 302c begin to extend, causing fluid to flow out of the first rebound chamber 328a of the front left damper 302a and the third rebound chamber 328c of the back left damper 302c into the front and rear hydraulic lines 334b, 336b of the second hydraulic circuit 320b. Again, if there are no high frequency impacts on the dampers 302a, 302b, 302c, 302d, the frequency dependent valves 344, 345 will remain closed. Fluid flows out of the second compression chamber 326b of the front right damper 302b, out of the fourth compression chamber 326d of the back right damper 302d, out of the first rebound chamber 328a of the front left damper 302a, and out of the third rebound chamber 328c of the back left damper 302c and into the front and rear hydraulic lines 334b, 336b of the second hydraulic circuit 320b, which increases the pressure in the front right and back right accumulators 342b, 342d and provides passive roll resistance where it becomes increasingly more difficult to compress the front right damper 302b and the back right damper 302d since the second compression chamber 326b of the front right damper 302b and the fourth compression chamber 326d of the back right damper 302d are connected in fluid communication with the second hydraulic circuit 320b. At the same time, fluid flows out of front left and back left accumulators 342a, 342c and into the second rebound chamber 328b of the front right damper 302b, into the fourth rebound chamber 328d of the back right damper 302d, into the first compression chamber 326a of the front left damper 302a, and into the third compression chamber 326c of the back left damper 302c. The resulting pressure difference between the dampers 302a, 302b, 302c, 302d generates damper forces that counteract or resist the roll moment of the vehicle.

If the front left damper 302a and/or the back left damper 302b encounter high frequency impacts (like pot-holes and bumps), pressure in the first longitudinal hydraulic line 332a and therefore pressure in the first manifold conduit 338a will rapidly increase, causing the first frequency dependent valve 344 to open. When this occurs, the fluid pressure in the first hydraulic circuit 320a is distributed to the second hydraulic circuit 320b to help reduce unwanted suspension movements resulting from the hydraulic coupling of one damper of the system to another damper of the system (e.g., where the compression of one damper causes movement and/or a dampening change in another damper) because the combined volume and flow resistance of the first and second hydraulic circuits 320a, 320b helps attenuate pressure pulses and therefore enhances the ride comfort of the suspension system 300. For example, when the front left damper 302a undergoes a high frequency compression stroke as the front left wheel hits a bump, fluid may flow from the first compression chamber 326a of the front left damper 302a into the first longitudinal hydraulic line 332a, causing a high frequency pressure change in the first hydraulic circuit 320a, which enters the first manifold conduit 338a and causes the first frequency dependent valve 344 to open. When this occurs, fluid in the first manifold conduit 338a can pass through the first fluid transfer flow path 340 in the manifold assembly 304 and the first frequency dependent valve 344 and flow into the second manifold conduit 338b and therefore into the second hydraulic circuit 320b. In other words, when the first frequency dependent valve 344 opens, fluid can travel from the first hydraulic circuit 320a to the second hydraulic circuit 320b, which allows a high frequency pressure change in one of the hydraulic lines 332a, 332b, 334a, 334b, 336a, 336b to dissipate throughout the other hydraulic lines in the suspension system 300 so that a high frequency impact on one damper generates little to no response in the other dampers of the suspension system 300 for improved ride comfort.

Similarly, if the front right damper 302b and/or the back right damper 302d encounter high frequency impacts (like pot-holes and bumps), pressure in the second longitudinal hydraulic line 332b and therefore pressure in the second manifold conduit 338b will rapidly increase, causing the second frequency dependent valve 345 to open. When this occurs, the fluid pressure in the second hydraulic circuit 320b is distributed to the first hydraulic circuit 320a to help reduce unwanted suspension movements resulting from the hydraulic coupling of one damper of the system to another damper of the system (e.g., where the compression of one damper causes movement and/or a dampening change in another damper) because the combined volume and flow resistance of the first and second hydraulic circuits 320a, 320b helps attenuate pressure pulses and therefore enhances the ride comfort of the suspension system 300.

As shown in FIG. 9, the manifold block 301 of the manifold assembly 304 has a first valve cavity 360 that receives the first frequency dependent valve 344 and a second valve cavity 361 that receives the second frequency dependent valve 345. The first and second valve cavities 360, 361 are arranged in fluid communication with the first manifold conduit 338a via a third manifold conduit 383 that extends within the manifold block 301 from the first manifold conduit 338a to the first and second valve cavities 360, 361. The first and second valve cavities 360, 361 are arranged in fluid communication with the second manifold conduit 338b via a fourth manifold conduit 384 that extends within the manifold block 301 from the second manifold conduit 338b to the first and second valve cavities 360, 361.

The first fluid transfer flow path 340 is formed by and extends through the third manifold conduit 383, the first valve cavity 360, and the fourth manifold conduit 384, while the second fluid transfer flow path 341 is formed by and extends through the third manifold conduit 383, the second valve cavity 361, and the fourth manifold conduit 384. As will be explained in greater detail below, the first frequency dependent valve 344 only permits fluid flow through the first fluid transfer flow path 340 in one direction from the first manifold conduit 338a to the second manifold conduit 338b during high frequency impacts and the second frequency dependent valve 345 only permits fluid flow through the second fluid transfer flow path 341 in an opposite direction from the second manifold conduit 338b to the first manifold conduit 338a during high frequency impacts.

Each of the frequency dependent valve 344, 345 includes a valve housing 363, a spool valve assembly 364, and an end cap 365 that is threadingly or otherwise attached to valve housing 363. The spool valve assembly 364 includes a valve spool 366, a check valve 367, a valve disc 368, a spring seat 369, one or more spring discs 370, and a valve seat 371. The valve spool 366, valve disc 368, and spring seat 369 are slidably disposed within the valve housing 363, while the valve seat 371 is fixedly attached to the valve housing 363. The valve spool 366 has a tubular stem 372 that extends through the center of the valve seat 371 in a sliding arrangement and contacts the valve disc 368, which is positioned between the spring seat 369 and the valve seat 371. The spring disc(s) 370 are disposed between the end cap 365 and the spring seat 369 to bias the spring seat 369 against the valve disc 368 and bias the valve disc 368 against both the valve seat 371 and the stem 372 of the valve spool 366. The tubular stem 372 of the valve spool defines an axial passage 373 that also extends through the valve housing 363 and the valve disc 368.

The first frequency dependent valve 344 includes a first ported body 374 that is disposed in the first valve cavity 360 in an abutting arrangement with the end cap 365 of the first frequency dependent valve 344. The second frequency dependent valve 345 includes a second ported body 375 that is disposed in the second valve cavity 361 in an abutting arrangement with the valve housing 363 of the second frequency dependent valve 345. Both ported bodies 374, 375 have ports 376 that are arranged in fluid communication with the fourth manifold conduit 384 in the manifold block 301. Thus, the spool valve assemblies 364 of the first and second frequency dependent valves 344, 345 are vertically oriented in opposite directions where the axial passage 373 of the first frequency dependent valve 344 opens to the third manifold conduit 383 in the manifold block 301 and the axial passage 373 of the second frequency dependent valves 345 opens to the fourth manifold conduit 384 in the manifold block 301.

When fluid pressure rapidly rises in the first longitudinal hydraulic line 332a and therefor in the first manifold conduit 338a, such as when the front left damper 302a and/or back left damper 302c experience a high frequency impact (compression stroke), hydraulic fluid will flow through the first fluid transfer flow path 340, reducing unwanted suspension movements that would otherwise be caused by hydraulic coupling. In other words, a high frequency pressure pulse in the first longitudinal hydraulic line 332a will open the first frequency dependent valve 344, which then permits hydraulic fluid in the first hydraulic circuit 320a to flow into the second hydraulic circuit 320b. When this occurs, hydraulic fluid enters the third manifold conduit 383 from the first manifold conduit 338a and enters the axial passage 373 in the first frequency dependent valve 344. The fluid pressure in the axial passage 373 pushes the valve spool 366, valve disc 368, and spring seat 369 towards the end cap 365 against the biasing force of the spring disc(s) 370, opening the first frequency dependent valve 344. Thus, the hydraulic fluid in the first passageway 347 can flow along fluid transfer flow path 340 by passing through the axial passage 373, through one or more orifices 377 in the end cap 365 of the first frequency dependent valve 344, through the ports 376 in the first ported body 374 and into the fourth manifold conduit 384, where the hydraulic fluid then flows to the second manifold conduit 338b and into the second longitudinal hydraulic line 332b.

When fluid pressure rapidly rises in the second longitudinal hydraulic line 332b and therefor in the second manifold conduit 338b, such as when the front right damper 302b and/or back right damper 302d experience a high frequency impact (compression stroke), hydraulic fluid will flow through the second fluid transfer flow path 341, reducing unwanted suspension movements that would otherwise be caused by hydraulic coupling. In other words, a high frequency pressure pulse in the second longitudinal hydraulic line 332b will open the second frequency dependent valve 345 and travel through the second fluid transfer flow path 341. When this occurs, hydraulic fluid in the second longitudinal hydraulic line 332b enters the second manifold conduit 338b, passes through the fourth manifold conduit 384 and the ports 376 in the second ported body 375, and enters the axial passage 373 in the second frequency dependent valve 345. The fluid pressure in the axial passage 373 pushes the valve spool 366, valve disc 368, and spring seat 369 towards the end cap 365 against the biasing force of the spring disc(s) 370, opening the second frequency dependent valve 345. Thus, the hydraulic fluid in the fourth manifold conduit 384 can flow along the second fluid transfer flow path 341 by passing through the ports 376 in the second ported body 375, through the axial passage 373, through one or more orifices 377 in the end cap 365 of second frequency dependent valve 345, and into the third manifold conduit 383, where the hydraulic fluid then flows to the first manifold conduit 338a and into the first longitudinal hydraulic line 332b.

Figure 10:
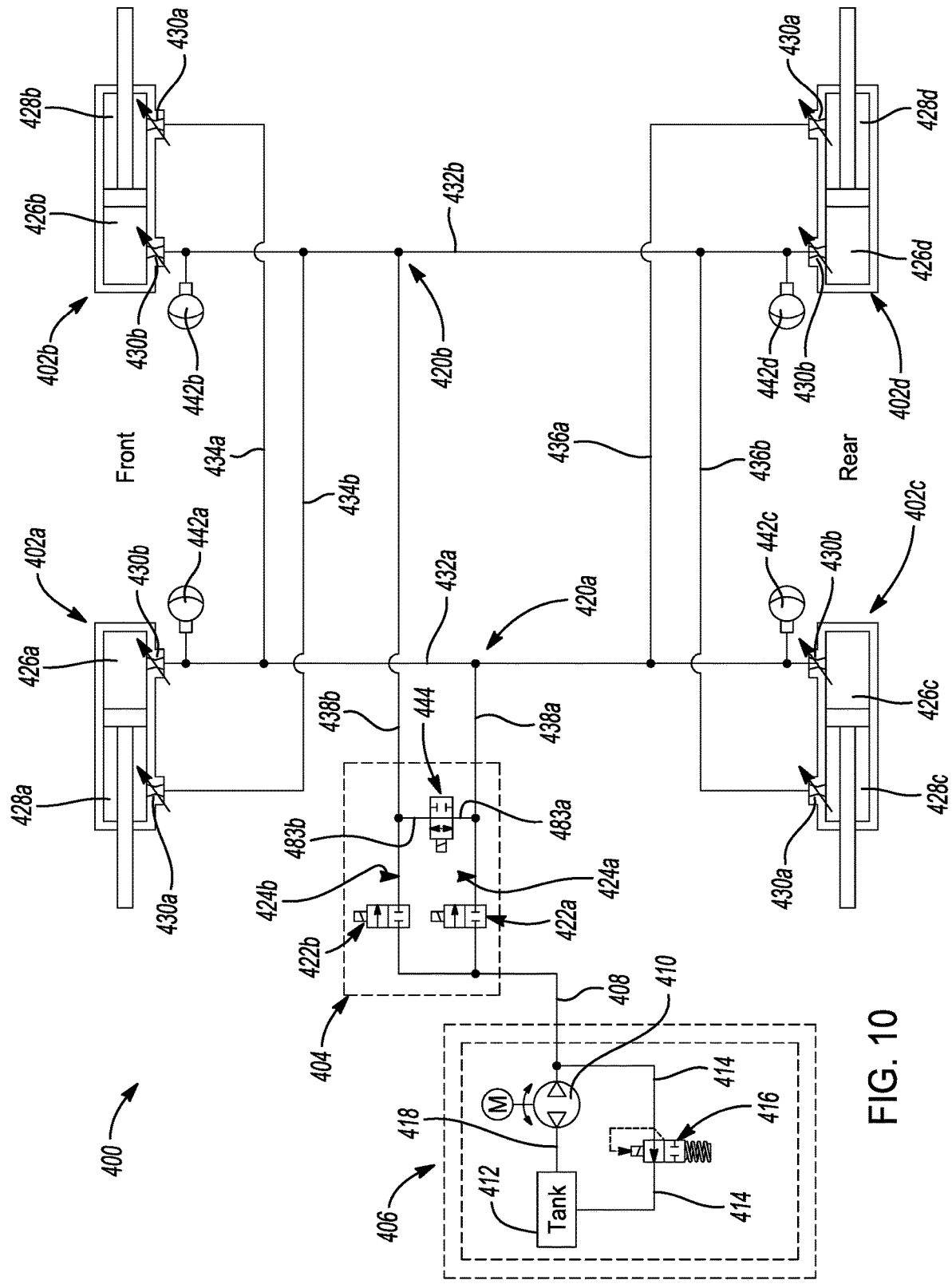
FIG. 10 is a schematic diagram illustrating another exemplary suspension system of the present disclosure that includes a manifold assembly with a single bi-directional frequency dependent roll stiffness valve.
Figure 11:
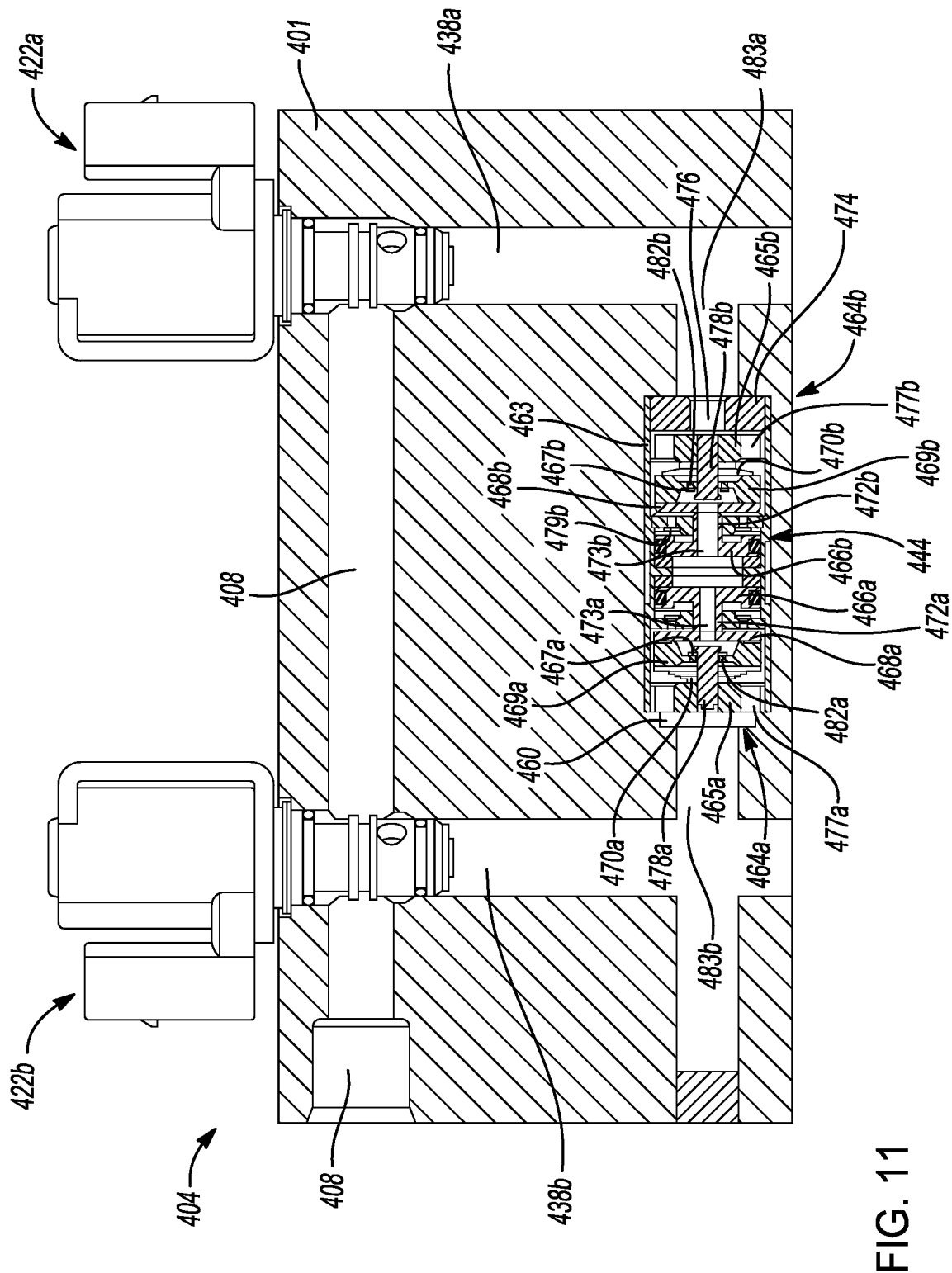
FIG. 11 is a side cross-section view of a portion of the manifold assembly shown in FIG. 10 where the single bi-directional frequency dependent roll stiffness valve is illustrated in greater detail.

FIGS. 10 and 11 illustrate another suspension system 400 that shares many of the same components as the suspension system 300 illustrated in FIGS. 8 and 9, but in FIGS. 10 and 11 a single bi-directional frequency dependent valve 444 positioned in the manifold assembly 404 replaces the two frequency dependent valves 344, 345 illustrated in FIGS. 8 and 9. The single bi-directional frequency dependent valve 444 in FIGS. 10 and 11 has the same construction as the bi-directional frequency dependent valves 244a shown in FIGS. 6 and 7, but the bi-directional frequency dependent valve 444 in FIGS. 10 and 11 is positioned in the manifold block 401 of the manifold assembly 404 instead of in the valve block 209 of a damper 202a, 202b, 202c, 202d. Rather than repeat the description set forth above, the following paragraphs describe the structure and function of the components in FIGS. 10 and 11 that are new and/or different from those shown and described in connection with FIGS. 8 and 9. It should be appreciated that the reference numbers in FIGS. 8 and 9 are "300" series numbers (e.g., 300, 302, 304, etc.) whereas the components in FIGS. 10 and 11 that are the same or similar to the components of the suspension system 300 shown in FIGS. 8 and 9 share the same base reference numbers, but are listed as "400" series numbers (e.g., 400, 402, 404, etc.). Thus, the same description for element 300 above applies to element 400 in FIGS. 10 and 11 and so on and so forth.

The suspension system 400 illustrated in FIG. 10 includes a manifold assembly 404 with first and second manifold valves 422a, 422b that are arranged in fluid communication with a pump hydraulic line 408. The first manifold valve 422a is also arranged in fluid communication with a first manifold conduit 438a and the second manifold valve 422b is also arranged in fluid communication with a second manifold conduit 438b. The manifold assembly 204 shown in FIG. 2 further comprises two segments of a third manifold conduit 483a, 483b that extends between and is connected in fluid communication with the first and second manifold conduits 438a, 438b. The single bi-directional frequency dependent valve 444 is arranged along and connected in-line with the two segments of the third manifold conduit 483a, 483b and therefore controls fluid flow between the first and second manifold conduits 438a, 438b.

When one or more of the dampers 402a, 402b, 402c, 402d encounter high frequency impacts (like pot-holes and bumps), the frequency dependent valve 444 will open to permit fluid flow through the two segments of the third manifold conduit 483 in a direction from the first manifold conduit 438a to the second manifold conduit 438b or in an opposite direction from the second manifold conduit 438b to the first manifold conduit 438a to enhance the ride comfort of the suspension system 400 and reduce unwanted suspension movements resulting from the hydraulic coupling of one damper of the system to another damper of the system (e.g., where the compression of one damper causes movement and/or a dampening change in another damper). For example, when the front left damper 402a undergoes a high frequency compression stroke as the front left wheel hits a bump, fluid may flow from the first compression chamber 426a of the front left damper 402a into the first longitudinal hydraulic line 432a, causing a high frequency pressure change in the first hydraulic circuit 420a, which enters the first manifold conduit 438a and causes the frequency dependent valve 444 to open. When this occurs, fluid in the first manifold conduit 438a can pass through the two segments of the third manifold conduit 483a, 483b and the frequency dependent valve 444 and flow into the second manifold conduit 438b and therefore into the second longitudinal hydraulic line 432b. In other words, when the frequency dependent valve 444 opens, fluid can travel from the first hydraulic circuit 420a to the second hydraulic circuit 420b or vice versa, which allows a high frequency pressure change in one of the hydraulic lines 432a, 432b, 434a, 434b, 436a, 436b to dissipate throughout the other hydraulic lines in the system so that a high frequency impact on one damper generates little to no response in the other dampers of the system for improved ride comfort.

As shown in FIG. 11, the manifold block 401 of the manifold assembly 404 has a valve cavity 460 that receives the frequency dependent valve 444. The valve cavity 460 is arranged in-line and in fluid communication with the two segments of the third manifold conduit 483a, 483b. Together, valve cavity 460 and the two segments of the third manifold conduit 483a, 483b form fluid transfer flow path 440.

The frequency dependent valve 444 includes a valve housing 463, a first spool valve assembly 464a that permits fluid flow through the fluid transfer flow path 440 in one direction from the first manifold conduit 438a to the second manifold conduit 438b during high frequency impacts, and a second spool valve assembly 464b that permits fluid flow through the fluid transfer flow path 440 in an opposite direction from the second manifold conduit 438b to the first manifold conduit 438a during high frequency impacts.

Each spool valve assembly 464a, 464b includes a valve spool 466a, 466b, a check valve 467a, 467b, a valve disc 468a, 468b, a spring seat 469a, 469b, one or more spring discs 470a, 470b, a valve seat 471a, 471b, and an end cap 465a, 465b that is threadingly or otherwise attached to valve housing 463. Each valve spool 466a, 466b, valve disc 468a, 468b, and spring seat 469a, 469b is slidably disposed within the valve housing 463, while the valve seats 471a, 471b are fixedly attached to the valve housing 463. Each valve spool 466a, 466b has a tubular stem 472a, 472b that extends through the center of each respective valve seat 471a, 471b in a sliding arrangement and contacts each respective valve disc 468a, 468b, which are positioned between the spring seats 469a, 469b and the valve seats 471a, 471b. The spring discs 470a, 470b are disposed between the end caps 465a, 465b and the spring seats 469a, 469b to bias the spring seats 469a, 469b against the valve discs 468a, 468b and bias the valve discs 468a, 468b against the valve seats 471a, 471b and the stem 472a, 472b of each valve spool 466a, 466b. The tubular stem 472a, 472b of each valve spool defines an axial passage 473a, 473b. A ported body 474 is positioned directly adjacent to the end cap 465b of the second spool valve assembly 464b and includes a central port 476 that is arranged in fluid communication with the first manifold conduit 438a. Each end cap 465a, 465b includes one or more orifices 477a, 477b that pass through the end cap 465a, 465b.

When fluid pressure rapidly rises in the first longitudinal hydraulic line 432a, such as when the front left damper 402a and/or back left damper 402c experience a high frequency impact (compression stroke), hydraulic fluid will flow into the first manifold conduit 438a and through the fluid transfer flow path 440 in the manifold block 401, reducing unwanted suspension movements that would otherwise be caused by hydraulic coupling. In other words, a high frequency pressure pulse in the first longitudinal hydraulic line 432a will open the first spool valve assembly 464a of the bi-directional frequency dependent valve 444 and will travel through the fluid transfer flow path 440 in a direction going from the first longitudinal hydraulic line 432a to the second longitudinal hydraulic line 432b. When this occurs, hydraulic fluid in the first longitudinal hydraulic line 432a enters the first manifold conduit 438a and then the first segment of the third manifold conduit 483a in the manifold block 401. The hydraulic fluid then flows into the central port 476 in the ported body 474 and through the orifices 477b in the end cap 465b of the second spool valve assembly 464b. From there, the hydraulic fluid flows through the apertures 482b in the spring seat 469b of the second spool valve assembly 464b, opens check valve 467b, and passes through the axial passage 473b in the valve spool 466b of the second spool valve assembly 464b. The hydraulic fluid flows from the axial passage 473b in the valve spool 466b of the second spool valve assembly 464b and enters the axial passage 473a in the valve spool 466a of the first spool valve assembly 464a. The fluid pressure in the axial passage 473a in the valve spool 466a of the first spool valve assembly 464a pushes the valve spool 466a, valve disc 468a, and spring seat 469a of the first spool valve assembly 464a towards the end cap 465a against the biasing force of the spring disc(s) 470a, opening the first spool valve assembly 464a and allowing the hydraulic fluid in the axial passage 473a of the valve spool 466a to flow to and through the orifices 477a in the end cap 465a of the first spool valve assembly 464a and into the second segment of the third manifold conduit 483b, where the hydraulic fluid then flows to the second manifold conduit 438b and into the second longitudinal hydraulic line 432b.

When fluid pressure rapidly rises in the second longitudinal hydraulic line 432b, such as when the front right damper 402b and/or the back right damper 402d experiences a high frequency impact (compression stroke), hydraulic fluid will flow through the fluid transfer flow path 440 in the opposite direction, again reducing unwanted suspension movements that would otherwise be caused by hydraulic coupling. In other words, a high frequency pressure pulse in the second longitudinal hydraulic line 432b will open the second spool valve assembly 464b of the bi-directional frequency dependent valve 444a and will travel through the fluid transfer flow path 440 from the second longitudinal hydraulic line 432a to the first longitudinal hydraulic line 432a. When this occurs, hydraulic fluid in the second longitudinal hydraulic line 432b enters the second manifold conduit 438b, passes through the second segment of the third manifold conduit 483b, and flows into the orifices 477a in the end cap 465a of the first spool valve assembly 464a. From there, the hydraulic fluid flows through the apertures 482a in the spring seat 469a of the first spool valve assembly 464a, opens check valve 467a, and passes through the axial passage 473a in the valve spool 466a of the first spool valve assembly 464a. The hydraulic fluid flows from the axial passage 473a in the valve spool 466a of the first spool valve assembly 464a and enters the axial passage 473b in the valve spool 466b of the second spool valve assembly 464b. The fluid pressure in the axial passage 473b in the valve spool 466b of the second spool valve assembly 464b pushes the valve spool 466b, valve disc 468b, and spring seat 469b of the second spool valve assembly 464b towards the end cap 465b against the biasing force of the spring disc(s) 470b, opening the second spool valve assembly 464b and allowing the hydraulic fluid in the axial passage 473b of the valve spool 466b to flow to and through the orifices 477b in the end cap 465b of the second spool valve assembly 464b, through the central port 476 in the ported body 474, and into the first segment of the third manifold conduit 483a, where the hydraulic fluid then flows to the first manifold conduit 438a and into the first longitudinal hydraulic line 432a.

Many other modifications and variations of the present disclosure are possible in light of the above teachings and may be practiced otherwise than as specifically described while within the scope of the appended claims.

What is claimed is:

1. A suspension system, comprising:
   a front left damper including a first compression chamber and a first rebound chamber;
   a front right damper including a second compression chamber and a second rebound chamber;
   a back left damper including a third compression chamber and a third rebound chamber;
   a back right damper including a fourth compression chamber and a fourth rebound chamber;
   a first hydraulic circuit including a front hydraulic line, a rear hydraulic line, and a first longitudinal hydraulic line that extends between and fluidly connects said front and rear hydraulic lines of said first hydraulic circuit;
   said front hydraulic line of said first hydraulic circuit extending between and fluidly connecting said first longitudinal hydraulic line and said second rebound chamber of said front right damper;

said rear hydraulic line of said first hydraulic circuit extending between and fluidly connecting said first longitudinal hydraulic line and said fourth rebound chamber of said back right damper;

said first longitudinal hydraulic line extending between and fluidly connecting said first compression chamber of said front left damper and said third compression chamber of said back left damper;

a second hydraulic circuit including a front hydraulic line, a rear hydraulic line, and a second longitudinal hydraulic line that extends between and fluidly connects said front and rear hydraulic lines of said second hydraulic circuit;

said front hydraulic line of said second hydraulic circuit extending between and fluidly connecting said second longitudinal hydraulic line and said first rebound chamber of said front left damper;

said rear hydraulic line of said second hydraulic circuit extending between and fluidly connecting said second longitudinal hydraulic line and said third rebound chamber of said back left damper;

said second longitudinal hydraulic line extending between and fluidly connecting said second compression chamber of said front right damper and said fourth compression chamber of said back right damper; and at least one frequency dependent valve positioned between said first hydraulic circuit and said second hydraulic circuit that has a closed position where said at least one frequency dependent valve blocks fluid flow between said first and second hydraulic circuits and an open position where said at least one frequency dependent valve permits fluid flow between said first and second hydraulic circuits, wherein said first and third compression chambers of said front left and back left dampers are fluidly coupled to said second and fourth rebound chambers of said front right and back right dampers by said first hydraulic circuit and said second and fourth compression chambers of said front right and back right dampers are fluidly coupled to said first and third rebound chambers of said front left and back left dampers by said second hydraulic circuit such that said suspension system provides passive roll resistance when said at least one frequency dependent valve is closed and wherein said at least one frequency dependent valve is configured to switch from said closed position to said open position to hydraulicly decouple said dampers when fluid pressure increases within said first hydraulic circuit or said second hydraulic circuit rise above a pre-determined threshold frequency.

2. The suspension system as set forth in claim 1, wherein each damper includes a damper housing and wherein said at least one frequency dependent valve includes a front left pair of frequency dependent valves mounted to said damper housing of said front left damper, a front right pair of frequency dependent valves mounted to said damper housing of said front right damper, a back left pair of frequency dependent valves mounted to said damper housing of said back left damper, and a front left pair of frequency dependent valves mounted to said damper housing of said front left damper.

3. The suspension system as set forth in claim 2, further comprising:

a front left pair of fluid transfer flow paths in said damper housing of said front left damper that extend between and fluidly connect said first longitudinal hydraulic line of said first hydraulic circuit and said front hydraulic line of said second hydraulic circuit;

a front right pair of fluid transfer flow paths in said damper housing of said front right damper that extend between and fluidly connect said front hydraulic line of said first hydraulic circuit and said second longitudinal hydraulic line of said second hydraulic circuit;

a back left pair of fluid transfer flow paths in said damper housing of said back left damper that extend between and fluidly connect said first longitudinal hydraulic line of said first hydraulic circuit and said rear hydraulic line of said second hydraulic circuit; and a back right pair of fluid transfer flow paths in said damper housing of said back right damper that extend between and fluidly connect said rear hydraulic line of said first hydraulic circuit and said second longitudinal hydraulic line of said second hydraulic circuit.

4. The suspension system as set forth in claim 3, wherein said front left pair of frequency dependent valves are positioned along and control fluid flow through said front left pair of fluid transfer flow paths, said front right pair of frequency dependent valves are positioned along and control fluid flow through said front right pair of fluid transfer flow paths, said back left pair of frequency dependent valves are positioned along and control fluid flow through said back left pair of fluid transfer flow paths, and said back right pair of frequency dependent valves are positioned along and control fluid flow through said back right pair of fluid transfer flow paths.

5. The suspension system as set forth in claim 4, wherein each pair of frequency dependent valves includes a first frequency dependent valve that is a passive one-way valve that permits fluid flow through one of said fluid transfer flow paths in a first direction and a second frequency dependent valve that is a passive one-way valve that permits fluid flow through the other one of said fluid transfer flow paths in said pair of fluid transfer flow paths in a second direction that is the opposite of said first direction.

6. The suspension system as set forth in claim 1, wherein each damper includes a damper housing and wherein said at least one frequency dependent valve includes a front left frequency dependent valve mounted to said damper housing of said front left damper, a front right frequency dependent valve mounted to said damper housing of said front right damper, a back left frequency dependent valve mounted to said damper housing of said back left damper, and a back left frequency dependent valve mounted to said damper housing of said back left damper.

7. The suspension system as set forth in claim 6, further comprising:

a front left fluid transfer flow path in said damper housing of said front left damper that extends between and fluidly connects said first longitudinal hydraulic line of said first hydraulic circuit and said front hydraulic line of said second hydraulic circuit;

a front right fluid transfer flow path in said damper housing of said front right damper that extends between and fluidly connects said front hydraulic line of said first hydraulic circuit and said second longitudinal hydraulic line of said second hydraulic circuit;

a back left fluid transfer flow path in said damper housing of said back left damper that extends between and fluidly connects said first longitudinal hydraulic line of said first hydraulic circuit and said rear hydraulic line of said second hydraulic circuit; and a back right fluid transfer flow path in said damper housing of said back right damper that extends between and fluidly connects said rear hydraulic line of said first hydraulic circuit and said second longitudinal hydraulic line of said second hydraulic circuit.

8. The suspension system as set forth in claim 7, wherein said front left frequency dependent valve is positioned along and controls fluid flow through said front left fluid transfer flow path, said front right frequency dependent valve is positioned along and controls fluid flow through said front right fluid transfer flow path, said back left frequency dependent valve is positioned along and controls fluid flow through said back left fluid transfer flow path, and said back right frequency dependent valve is positioned along and controls fluid flow through said back right fluid transfer flow path.

9. The suspension system as set forth in claim 8, wherein each frequency dependent valve is a passive bi-directional valve that permits fluid flow through one of said fluid transfer flow paths in a first direction in response to pressure pulses traveling through said fluid transfer flow path in said first direction and that permits fluid flow through said fluid transfer flow path in a second direction that is opposite said first direction in response to pressure pulses traveling through said fluid transfer flow path in said second direction.

10. The suspension system as set forth in claim 1, further comprising:
a manifold assembly with first and second manifold valves, said first and second manifold valves being electromechanical valves;
a first manifold conduit that extends between and fluidly connects said first longitudinal hydraulic line and said first manifold valve; and
a second manifold conduit that extends between and fluidly connects said second longitudinal hydraulic line and said second manifold valve,
wherein said at least one frequency dependent valve is positioned between and arranged in fluid communication with said first and second manifold conduits to control fluid flow between said first and second manifold conduits.

11. The suspension system as set forth in claim 10, wherein said at least one frequency dependent valve includes a first frequency dependent valve that is positioned along and controls fluid flow through a first fluid transfer flow path that extends between and fluidly connects said first and second manifold conduits and a second frequency dependent valve that is positioned along and controls fluid flow through a second fluid transfer flow path that extends between and fluidly connects said first and second manifold conduits.

12. The suspension system as set forth in claim 11, wherein said first frequency dependent valve is a passive one-way valve that permits fluid flow through said first fluid transfer flow path in a first direction and said second frequency dependent valve is a passive one-way valve that permits fluid flow through said second fluid transfer flow path in a second direction that is opposite said first direction.

13. The suspension system as set forth in claim 10, wherein said at least one frequency dependent valve is positioned along and controls fluid flow through a fluid transfer flow path that extends between and fluidly connects said first and second manifold conduits and wherein said at least one frequency dependent valve is a passive bi-directional valve that permits fluid flow through said fluid transfer flow path in a first direction in response to pressure pulses traveling through said fluid transfer flow path in said first direction and that permits fluid flow through said fluid transfer flow path in a second direction that is opposite said first direction in response to pressure pulses traveling through said fluid transfer flow path in said second direction.

14. The suspension system as set forth in claim 1, wherein said at least one frequency dependent valve is a passive one-way valve that includes a valve housing, a spool valve assembly, an end cap, and a ported body, wherein said spool valve assembly includes a valve spool, a check valve, a valve disc, a spring seat, one or more spring discs, and a valve seat, wherein said valve spool, said valve disc, and said spring seat are slidably disposed within said valve housing and said valve seat is fixedly attached to said valve housing, and wherein said valve spool has a tubular stem that extends through said valve seat in a sliding arrangement, contacts said valve disc, and defines an axial passage within said at least one frequency dependent valve.

15. The suspension system as set forth in claim 1, wherein said at least one frequency dependent valve is a passive bi-directional valve that includes a valve housing, a first spool valve assembly that permits fluid flow through said at least one frequency dependent valve in one direction during high frequency impacts, and a second spool valve assembly that permits fluid flow through said at least one frequency dependent valve in an opposite direction during high frequency impacts, wherein each spool valve assembly includes wherein said spool valve assembly includes a valve spool, a check valve, a valve disc, a spring seat, one or more spring discs, and a valve seat, wherein said valve spool, said valve disc, and said spring seat are slidably disposed within said valve housing and said valve seat is fixedly attached to said valve housing, wherein said valve spool has a tubular stem that extends through said valve seat in a sliding arrangement, contacts said valve disc, and defines an axial passage within said at least one frequency dependent valve, and wherein each end cap includes one or more orifices that pass through said end cap.

16. A suspension system, comprising:
a front left damper including a damper housing, a first compression chamber, and a first rebound chamber;
a front right damper including a damper housing, a second compression chamber, and a second rebound chamber;
a back left damper including a damper housing, a third compression chamber, and a third rebound chamber;
a back right damper including a damper housing, a fourth compression chamber, and a fourth rebound chamber;
a first hydraulic circuit including a front hydraulic line, a rear hydraulic line, and a first longitudinal hydraulic line that extends between and fluidly connects said front and rear hydraulic lines of said first hydraulic circuit;
said front hydraulic line of said first hydraulic circuit extending between and fluidly connecting said first longitudinal hydraulic line and said second rebound chamber of said front right damper;
said rear hydraulic line of said first hydraulic circuit extending between and fluidly connecting said first longitudinal hydraulic line and said fourth rebound chamber of said back right damper;
said first longitudinal hydraulic line extending between and fluidly connecting said first compression chamber of said front left damper and said third compression chamber of said back left damper;
a second hydraulic circuit including a front hydraulic line, a rear hydraulic line, and a second longitudinal hydraulic line that extends between and fluidly connects said front and rear hydraulic lines of said second hydraulic circuit;

said front hydraulic line of said second hydraulic circuit extending between and fluidly connecting said second longitudinal hydraulic line and said first rebound chamber of said front left damper;

said rear hydraulic line of said second hydraulic circuit extending between and fluidly connecting said second longitudinal hydraulic line and said third rebound chamber of said back left damper;

said second longitudinal hydraulic line extending between and fluidly connecting said second compression chamber of said front right damper and said fourth compression chamber of said back right damper; and at least one frequency dependent valve disposed on or in said damper housing of each of said dampers and that is arranged to control fluid flow between said first hydraulic circuit and said second hydraulic circuit, wherein each frequency dependent valve has a closed position where said frequency dependent valve blocks fluid flow between said first and second hydraulic circuits and an open position where said frequency dependent valve permits fluid flow between said first and second hydraulic circuits, wherein said first and third compression chambers of said front left and back left dampers are fluidly coupled to said second and fourth rebound chambers of said front right and back right dampers by said first hydraulic circuit and said second and fourth compression chambers of said front right and back right dampers are fluidly coupled to said first and third rebound chambers of said front left and back left dampers by said second hydraulic circuit such that said suspension system provides passive roll resistance when said frequency dependent valves are closed and wherein said frequency dependent valves are configured to switch from said closed position to said open position to hydraulicly decouple said dampers when fluid pressure increases within said first hydraulic circuit or said second hydraulic circuit rise above a pre-determined threshold frequency.

17. The suspension system as set forth in claim 16, wherein each damper includes a rebound valve and a compression valve that are disposed on or in said damper housing of each damper and wherein said rebound and compression valves are electromechanical valves that are configured to set a rebound dampening rate and a compression dampening rate for each of said dampers.

* * * * *